(12) United States Patent
Fukunaga et al.

(10) Patent No.: US 6,169,821 B1
(45) Date of Patent: *Jan. 2, 2001

(54) PICTURE CODER, PICTURE DECODER, AND PICTURE TRANSMISSION SYSTEM

(75) Inventors: Shigeru Fukunaga; Toshihisa Nakai, both of Tokyo (JP)

(73) Assignee: Oki Electric Industry Co., Ltd., Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/710,405

(22) Filed: Sep. 17, 1996

(30) Foreign Application Priority Data

Sep. 18, 1995 (JP) ................................................... 7-238650
Apr. 19, 1996 (JP) ................................................... 8-098629

(51) Int. Cl.[7] .................................................... G06K 9/00
(52) U.S. Cl. ................................................ 382/239; 382/236
(58) Field of Search .................................. 382/240, 232, 382/233, 234, 235, 236, 238, 239, 244, 248, 251; 348/403, 408, 416, 699; 364/715.02, 723, 725.01; 378/121; 341/118.51, 67; 386/81, 124

(56) References Cited

U.S. PATENT DOCUMENTS

| 4,422,171 | 12/1983 | Wortley et al. ........................ 371/32 |
| 4,670,851 | * 6/1987 | Murakami et al. .................... 364/518 |
| 4,751,742 | * 6/1988 | Meeker ................................. 382/41 |
| 4,774,587 | 9/1988 | Schmitt ................................. 358/260 |
| 4,827,339 | * 5/1989 | Wada et al. ........................... 358/136 |
| 5,317,397 | * 5/1994 | Odaka et al. .......................... 348/416 |
| 5,377,051 | * 12/1994 | Lane et al. ........................... 360/33.1 |
| 5,414,717 | 5/1995 | Matsumoto et al. .................... 371/32 |

FOREIGN PATENT DOCUMENTS

| 0 402 954 A2 | 12/1990 | (EP) | ............................... H04N 7/13 |
| 0 637 175 A2 | 2/1995 | (EP) | ............................... H04N 7/24 |
| 2 278 752 | 12/1994 | (GB) | ............................... H04N 7/14 |
| 5-219056 | 8/1993 | (JP) | ............................... H04L 12/18 |
| 6-237451 | 8/1994 | (JP) | ............................... H04L 11/20 |
| 095571A | 4/1995 | (JP) | ............................... H04N 7/24 |
| 7-095571 | 4/1995 | (JP) | ............................... H04N 7/24 |

OTHER PUBLICATIONS

Michael Rice et al. "Adaptive Error Control For Slowly Varying Channels". IEEE Transactions on Communications, vol. 42, No. 2/3/4, Feb., 1994, pp. 917–926.

S. Bakhtiyari et al. "A Robust Type II Hybrid ARQ Scheme with Code Combining for Mobile Communications". Proceedings of the Pacific Rim Conference on Communications, Comput and Signal Processing. May 19–21, 1993, vol. 1, pp. 214–217.

Dr. John O. Onunga et al. "A Simple Packet Retransmission Strategy for Throughput and Delay Enhancement on Power Line Communication Channels". IEEE Transactions on Power Delivery, vol. 8, No. 3, Jul. 1, 1993, pp. 818–826.

Internation Telecomm. Union, Revised at Helsinki, 1993, pp. 1–25. (No Author).

* cited by examiner

*Primary Examiner*—Bijan Tadayon
(74) *Attorney, Agent, or Firm*—Rabin & Champagne, P.C.

(57) ABSTRACT

A transmission system transmits a series of coded frames from a transmitting device to a receiving device, using both intra-frame coding and inter-frame coding. The receiving device decodes the frames and sends acknowledgment signals to the transmitting device. The transmitting device selects the reference frame employed in inter-frame coding according to these acknowledgment signals. The method of reference frame selection can be varied according to an assessment of transmission channel quality. The assessment criteria, or the reference frame selection method itself, can be varied in response to input from a human user.

102 Claims, 17 Drawing Sheets a b c d e f g h i j k a b c d e f g h i j k

PICTURE CODER, PICTURE DECODER, AND PICTURE TRANSMISSION SYSTEM

BACKGROUND OF THE INVENTION

The present invention relates to a picture coder, picture decoder, and picture transmission system that combine good data compression performance with a high tolerance of frame dropouts.

Recently there has been a proliferation of systems that transmit moving pictures through communication networks: examples include videophone, videoconferencing, and video-on-demand (VOD) systems. To reduce the volume of transmitted data, the pictures are digitized and compressively coded at the transmitting device, and decoded at the receiving device.

Two basic types of moving-picture coding can be distinguished: intra-frame coding, and inter-frame coding. Intra-frame coding codes each frame separately, or divides a frame into blocks and codes each block separately. Methods of intra-frame coding have been standardized by, for example, the Joint Photographic Experts Group (JPEG). Intra-frame coding compresses the data by reducing spatial redundancy in each frame.

Inter-frame coding reduces both spatial and temporal redundancy, by coding only the differences between one frame and a preceding frame. Inter-frame coding may include motion compensation, which yields high data compression ratios.

Methods that employ both intra- and inter-frame coding have been standardized by, for example, the Moving Picture Experts Group (MPEG) and the Telecommunication Standardization Sector of the international Telecommunication Union (ITU-T). FIG. 21 illustrates the coding system adopted in ITU-T Recommendation H.261. Intra-frame coding, indicated by hatching, is performed at regular intervals; inter-frame coding is carried out at other times. In inter-frame coding, each frame is coded with reference to the immediately preceding frame, as indicated by the arrows. Frames coded by inter-frame coding are in a sense predicted from the preceding frames, and are referred to as P-frames, while frames coded by intra-frame coding are referred to as I-frames. In FIG. 21, frames a and i are I-frames, while frames, b to h, j, and k are P-frames.

FIG. 22 shows an example of a problem that occurs in the H.261 scheme and similar schemes. If the receiving device is unable to decode frame e for some reason, then frames f, g, and h will also be undecodable. The receiving device will have to wait until it receives the next I-frame (frame i) before decoding can resume. Dropout of a single frame can thus lead to lengthy and highly undesirable gaps in the received moving picture.

Frame dropout can occur for a variety of reasons. Frames may be dropped intentionally at the receiving end because, for example, the decoder has a slower processing speed than the coder and is unable to keep up. In networks that transmit data in packets or cells, packets or cells may be dropped en route when the network becomes overloaded. This can occur in local-area networks employing the well-known Ethernet system, for example, or in wide-area networks employing the well-known asynchronous transmission mode (ATM). Particularly in wide-area networks, packets or cells may also arrive out of sequence, because of having been transmitted over different network routes, for example; this again causes problems in the decoding of P-frames.

To deal with these latter problems, some networks employ a protocol in which the transmitting device sends packets with attached serial numbers, and the receiving device rearranges the packets in the correct order, confirms their arrival, and sends requests for the retransmission of non-arriving packets back to the transmitting device. A well-known example of this type of protocol is the Transmission Control Protocol (TCP).

When network operation is unstable, however, and packets are dropped frequently, retransmission under this type of protocol can cause large cumulative delays to build up, which is unsuitable for the real-time transmission of moving pictures. When moving-picture data are transmitted, it is generally preferable to display new data, even if that means skipping a frame, rather than wait for the retransmission of old data.

These problems are compounded in multi-point transmission schemes such as broadcasting and multicasting schemes, which send the same data to multiple receiving sites. If the transmitting device heeds a retransmission request from one receiving site, it will often be forced to transmit to other sites a packet that those other sites have already received successfully, and the network load will be greatly increased. Broadcasting and multicasting are therefore usually carried out under a protocol that does not perform retransmission, such as the User Datagram Protocol (UDP); but as a result, the probability of frame dropout increases.

In wireless networks, frame dropout is a serious problem even when transmission takes place over a dedicated channel, instead of by packet or cell switching. Wireless transmission is highly prone to error, and when the errors exceed the error-correcting capability of the receiving device, the usual practice is to discard a certain section of the data in order to re-establish valid data processing. Data dropouts therefore tend to be larger than in wireline networks.

These factors limit the usefulness of the coding scheme illustrated in FIG. 21 to the transmission of moving pictures through telephone lines, integrated services digital networks (ISDNs), and other facilities that offer a reliable link, equivalent to a physical circuit, between the transmitting and receiving devices. For transmission through other types of networks, in which frame dropout or skipping is to some extent unavoidable, the scheme illustrated in FIG. 23 is often employed: all frames are coded as I-frames, using JPEG coding, for example.

When all frames are coded as I-frames, if a dropout occurs, as at frame e in FIG. 24, it has little effect on the perceived quality of the moving picture. In FIG. 24 only frame e is lost; the succeeding frames f, g, and h can be decoded successfully, because their decoding does not depend on preceding frames.

The problem with the all-I-frame scheme is that the data compression ratio is not very high, because temporal redundancy is not removed. Much network bandwidth is therefore consumed.

Japanese Patent Kokai Publication No. 95571/1995 discloses an alternative scheme, illustrated in FIG. 25, in which P-frames b to h are all coded with reference to the preceding I-frame (a). Under this scheme, the loss of a P-frame does not affect the decoding of other P-frames. A disadvantage of this scheme is that the data compression ratio tends to decline with each succeeding P-frame, due to increasing temporal distance between the P-frame and the I-frame to which the P-frame is referenced.

SUMMARY OF THE INVENTION

One object of the present invention is, accordingly, to enable P-frames, including P-frames coded with reference to a preceding P-frame, to be decoded after a frame dropout, without waiting for the next I-frame.

Another object of the invention is to enable picture quality to adapt to transmission channel conditions.

A further object is to enable data compression ratios to adapt to transmission channel conditions.

Still another object is to provide a human user with control over the quality of transmitted moving pictures, in ways suitable for different transmission channel conditions.

The invented transmission system transmits a series of frames from a transmitting device to a receiving device. Intra-frame coding or inter-frame coding is selected for each frame, and the corresponding coding process is carried out at the transmitting device. When inter-frame coding is selected, the frame is coded with reference to a reference frame, the reference frame being a frame that was coded previously. The coded data resulting from intra-frame coding and inter-frame coding are transmitted to the receiving device. The receiving device decodes the decoded data, and sends acknowledgment signals back to the transmitting device. The transmitting device selects the reference frame on the basis of these acknowledgment signals.

In a first preferred mode of operation, the receiving device transmits positive acknowledgment signals, and the transmitting device selects positively acknowledged frames as reference frames.

In a second preferred mode of operation, the receiving device transmits negative acknowledgment signals, and the transmitting device selects the most recently coded frame as the reference frame, except when a negative acknowledgment signal is received. When a negative acknowledgment signal is received, the reference frame is set back to a frame preceding the negatively acknowledged frame. A negative acknowledgment signal may be accompanied by a desired reference frame number, to enable the transmitting device to select a reference frame that the receiving device has successfully decoded.

In a third preferred mode of operation, both negative and positive acknowledgment signals are sent, the transmission channel quality is assessed according to these acknowledgment signals, and the method of reference frame selection is varied according to the assessment. For example, the reference frame can be selected as in the above first preferred mode under bad channel conditions, and as in the above second preferred mode under good channel conditions.

The channel quality assessment criteria and reference frame selection method can also be varied in response to input from a human user.

DETAILED DESCRIPTION OF THE INVENTION

Embodiments of the invention will be described with reference to the attached illustrative drawings.

These embodiments can be realized as, for example, semiconductor integrated circuits. Circuit-level descriptions will be omitted, as methods of designing and fabricating the necessary integrated circuits are well known to those skilled in the art. The invention can also be practiced through software means.

First embodiment

The first embodiment illustrates the general configuration of the coder and decoder in the invented moving-picture transmission system, and shows one scheme for the selection of reference frames. Other schemes will be elaborated in later embodiments.

Figure 1:
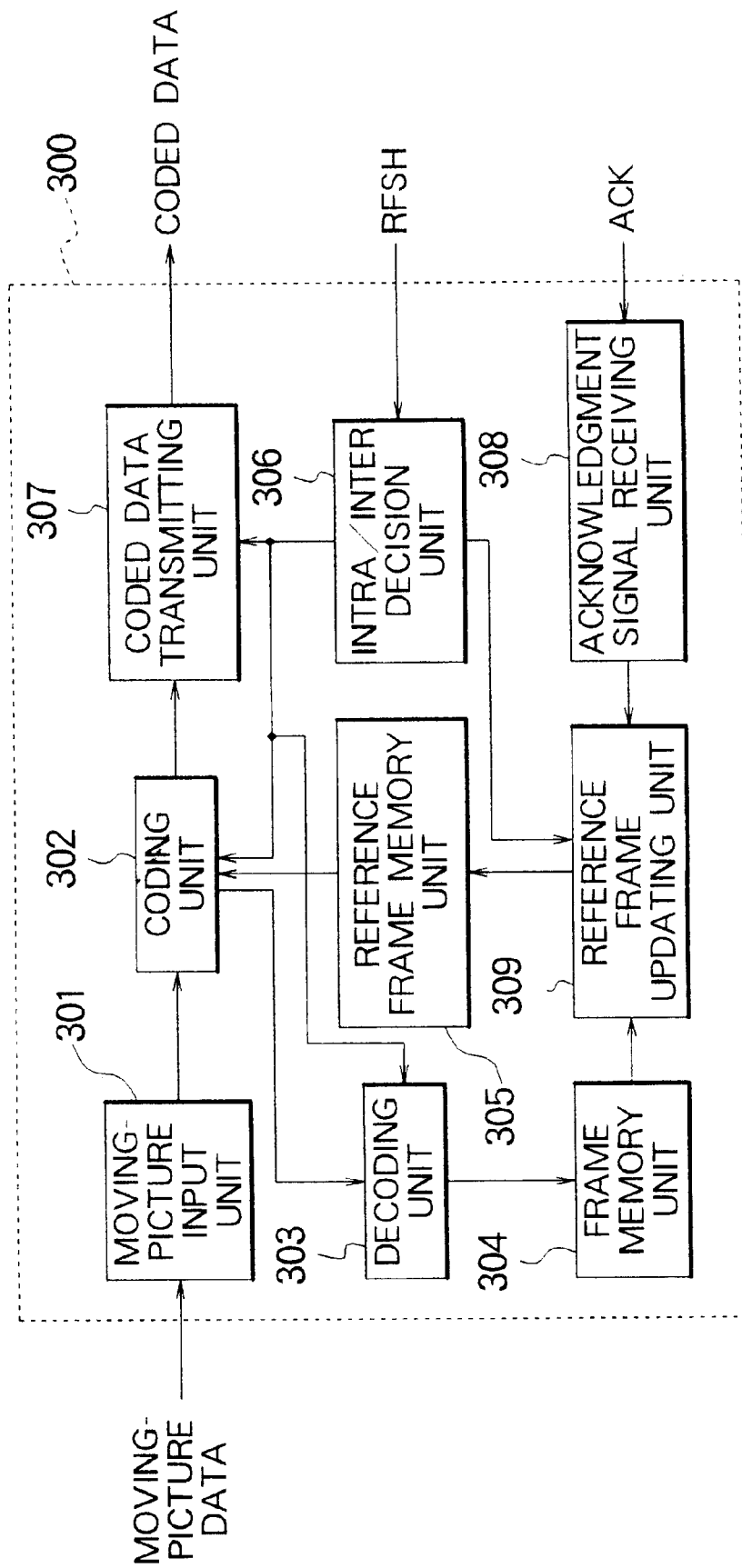
FIG. 1 is a block diagram of the moving-picture coder in the first embodiment.

FIG. 1 is a functional block diagram of the moving-picture coder 300 in the first embodiment. This coder, which is disposed in the transmitting device, comprises a moving-picture input unit 301, a coding unit 302, a decoding unit 303, a frame memory unit 304, a reference frame memory unit 305, an intra/inter decision unit 306, a coded data transmitting unit 307, an acknowledgment signal receiving unit 308, and a reference frame updating unit 309.

The moving-picture input unit 301 furnishes moving-picture data input from a video camera, for example, to the coding unit 302, frame by frame. The coding unit 302 codes the input frame data, and furnishes the coded data to the decoding unit 303 and coded data transmitting unit 307. The coding unit 302 performs intra-frame coding and inter-frame coding at the direction of the intra/inter decision unit 306. For inter-frame coding, the coding unit 302 refers to a reference frame stored in the reference frame memory unit 305, and codes only the difference between the current frame and the reference frame, preferably with motion compensation.

The decoding unit 303 decodes the coded data received from the coding unit 302, and writes the decoded frames and their frame numbers into the frame memory unit 304. The frame memory unit 304 stores these decoded frames. The reference frame memory unit 305 stores one reference frame, which is copied from the frame memory 304 by the reference frame updating unit 309.

The intra/inter decision unit 306 selects intra-frame coding or inter-frame coding and notifies the coding unit 302, decoding unit 303, and coded data transmitting unit 307 of the selection. Normally, intra-frame coding is selected at regular intervals (once every thirty frames, for example), and inter-frame coding is selected at other times. The intra/inter decision unit 306 may receive a refresh signal (RFSH), however, which forces intra-frame coding to be selected. The refresh signal is sent from the decoder, as described later. When intra-frame coding is selected, the reference frame updating unit 309 is also notified.

The coded data transmitting unit 307 transmits the coded moving-picture data through a transmission channel (not visible) to a moving-picture decoder, or to a plurality of moving-picture decoders at different receiving sites.

The coded data transmitting unit 307 multiplexes header information, including a reference frame number (for P-frames), an intra/inter flag, and other necessary information such as transmission routing information, onto the output data stream.

The acknowledgment signal receiving unit 308 receives positive acknowledgment (ACK) signals from the moving-picture decoder, and notifies the reference frame updating unit 309 of frames that have been positively acknowledged. In multi-point transmission, the acknowledgment signal receiving unit 308 notifies the reference frame updating unit 309 of frames that have been positively acknowledged by at least a certain number of receiving sites, preferably by all receiving sites.

The reference frame updating unit 309 updates the reference frame memory unit 305, responsive to the notifications received from the intra/inter decision unit 306 and acknowledgment signal receiving unit 308. Upon receiving an intra-frame coding notification from the intra/inter decision unit 306, the reference frame updating unit 309 waits for the current frame to be coded by the coding unit 302, decoded by the decoding unit 303, and written in the frame memory unit 304, then copies this frame from the frame memory unit 304 to the reference frame memory unit 305, and deletes all frame data from the frame memory unit 304. Upon receiving the frame number of a positively acknowledged frame from the acknowledgment signal receiving unit 308, the reference frame updating unit 309 waits for the coding unit 302 to finish using the frame stored in the reference frame memory unit 305 to code the current frame, then copies the positively acknowledged frame from the frame memory unit 304 to the reference frame memory unit 305, and deletes frame data up to and including the positively acknowledged frame from the frame memory unit 304.

Figure 2:
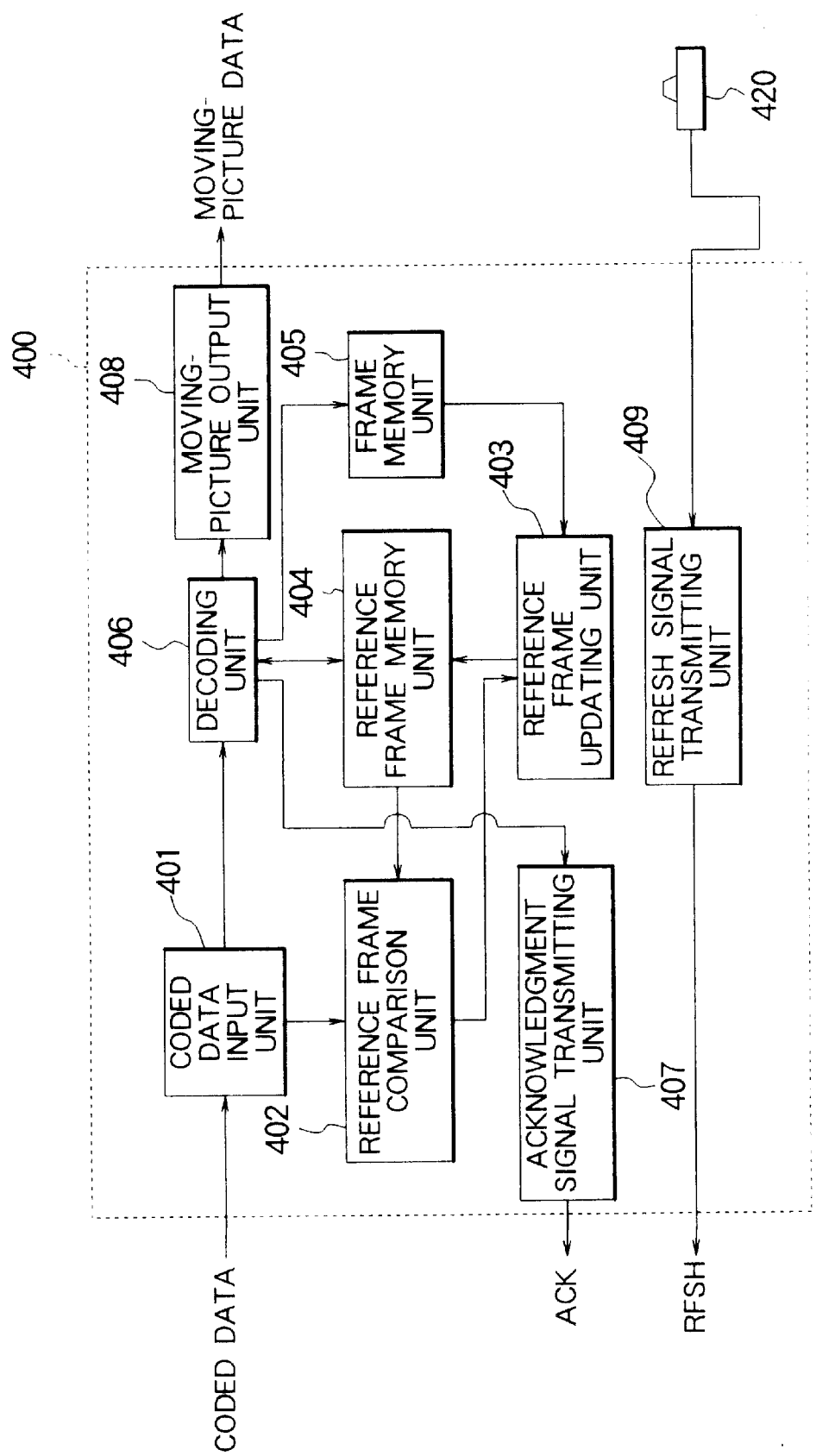
FIG. 2 is a block diagram of the moving-picture decoder in the first embodiment.

FIG. 2 is a functional block diagram of the moving-picture decoder 400 in the first embodiment. This decoder, which is disposed in the receiving device, comprises a coded data input unit 401, a reference frame comparison unit 402, a reference frame updating unit 403, a reference frame memory unit 404, a frame memory unit 405, a decoding unit 406, an acknowledgment signal transmitting unit 407, a moving-picture output unit 408, and a refresh signal transmitting unit 409.

The coded data input unit 401 receives the coded data and header information transmitted from the moving-picture coder 300, and furnishes the coded data to the decoding unit 406. From the header information, the coded data input unit 401 extracts the intra/inter flag and (for P-frames) the reference frame number, furnishes the intra/inter flag to the decoding unit 406, and furnishes the reference frame number to both the decoding unit 406 and the reference frame comparison unit 402.

The reference frame comparison unit 402 compares the reference frame number received from the coded data input unit 401 with a reference frame number stored in the reference frame memory unit 404. If the received reference frame number is newer than the stored reference frame number, the reference frame comparison unit 402 passes the received reference frame number to the reference frame updating unit 403, together with a reference frame update request.

Upon receiving a reference frame update request, the reference frame updating unit 403 searches for the frame with the received reference frame number in the frame memory unit 405. If the frame is found, the reference frame updating unit 403 copies this frame and its frame number into the reference frame memory unit 404, thereby updating the reference frame.

The reference frame memory unit 404 stores one reference frame and its frame number. The frame memory unit 405 stores decoded frame data and frame numbers of a number of most recent frames. Whenever the reference frame updating unit 403 updates the reference frame by copying a frame from the frame memory unit 405 to the reference frame memory unit 404, the copied frame and all preceding frames are deleted from the frame memory unit 405.

The decoding unit 406 decodes the coded data received from the coded data input unit 401, with reference to the attached intra/inter flag. When this flag indicates inter-frame coding, the decoding unit 406 first checks that the received reference frame number matches the reference frame number stored in the reference frame memory unit 404, and decodes the data only if these two frame numbers match; the decoding in this case is inter-frame, with reference to the reference frame stored in the reference frame memory unit 404.

During the decoding process, the decoding unit 406 performs an error check such as a cyclic redundancy check. If this check passes, the frame is considered to have been successfully decoded, and the decoding unit 406 sends the decoded data to the moving-picture output unit 408. If the frame was an I-frame, the decoding unit 406 also writes the decoded data and frame number into the reference frame memory unit 404, thus updating the reference frame, and furnishes the frame number to the acknowledgment signal transmitting unit 407. If the frame was a P-frame, the decoding unit 406 writes the decoded data and frame number into the frame memory unit 405. Under certain conditions, the decoding unit 406 also furnishes the frame number of a successfully decoded P-frame to the acknowledgment signal transmitting unit 407. Various conditions can be used; in the following description, it will be assumed that the frame number is furnished to the acknowledgment signal transmitting unit 407 if the coded data exceed a certain threshold size.

Upon receiving a frame number from the decoding unit 406, the acknowledgment signal transmitting unit 407 transmits a positive acknowledgment (ACK) signal to the moving-picture coder 300. The ACK signal includes the frame number received from the decoding unit 406.

The moving-picture output unit 408 outputs decoded data from the decoding unit 406 to a monitor display device or similar device. The refresh signal transmitting unit 409 receives refresh requests from a user-controlled input device 420 and sends corresponding refresh (RFSH) signals to the moving-picture coder 300.

Next, the operation of the first embodiment will be described with reference to FIGS. 3, 4, and 5. In these and subsequent drawings, acknowledgment signals are indicated by straight arrows, and reference relationships by curved arrows.

Figure 3:
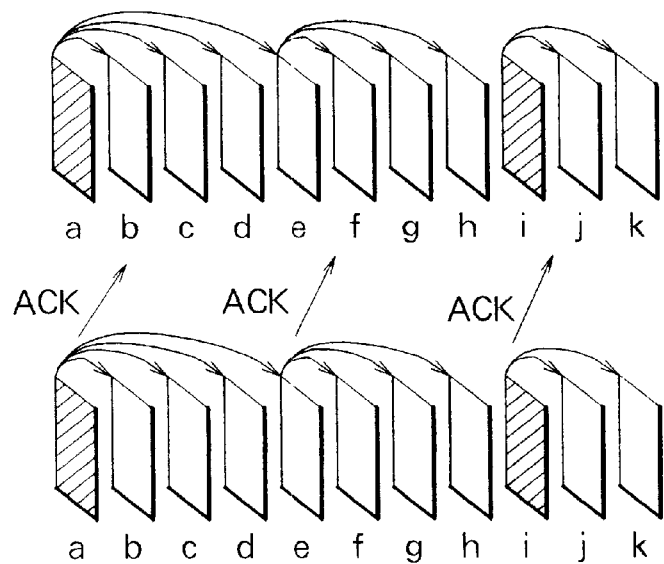
FIG. 3 shows an example of inter-frame coding relationships in the first embodiment.

FIG. 3 shows a case in which the coding and decoding processes and data transmission process are carried out at a comparatively high speed. The first frame (a) is coded as an I-frame, and is successfully transmitted to and decoded by the moving-picture decoder 400, which stores the decoded data in its reference frame memory unit 404 and returns a positive acknowledgment signal to the moving-picture coder 300, as indicated by the first arrow labeled ACK.

Frame a is also decoded by the decoding unit 303 at the moving-picture coder 300. The decoded data are written in the frame memory unit 304, then copied into the reference frame memory unit 305, so that the reference frame memory units 305 and 404 in the coder and decoder contain identical decoded data for use as a reference frame.

The next few frames (b, c, d, and e) are coded and decoded successfully with reference to this reference frame (a). Frames b, c, and d do not differ greatly from frame a, so the coded data size is small and the moving-picture decoder 400 does not return an acknowledgment signal. Frame e differs sufficiently, however, to cause a certain increase in the size of the coded data; the moving-picture decoder 400 accordingly returns a positive acknowledgment signal for frame e.

The moving-picture coder 300 receives this acknowledgment signal before coding of the next frame (f) begins. The reference frame updating unit 309 is thus able to copy the decoded data of frame e into the reference frame memory unit 305 in time for frame f to be coded with reference to frame e, thereby reducing the size of the coded data of frame f.

When the moving-picture decoder 400 receives the coded data of frame f, the reference frame comparison unit 402 finds that the attached reference frame number (of frame e) is newer than the frame number (of frame a) stored in the reference frame memory unit 404, and directs the reference frame updating unit 403 to copy frame e from the frame memory unit 405 to the reference frame memory unit 404. The decoding unit 406 then successfully decodes frame f with reference to frame e.

Frames g and h are also coded and successfully decoded with reference to frame e.

In a multi-point connection, the reference frame is changed from frame a frame e only if at least a certain number of receiving sites, preferably all receiving sites, return positive acknowledgment signals for frame e.

Figure 4:
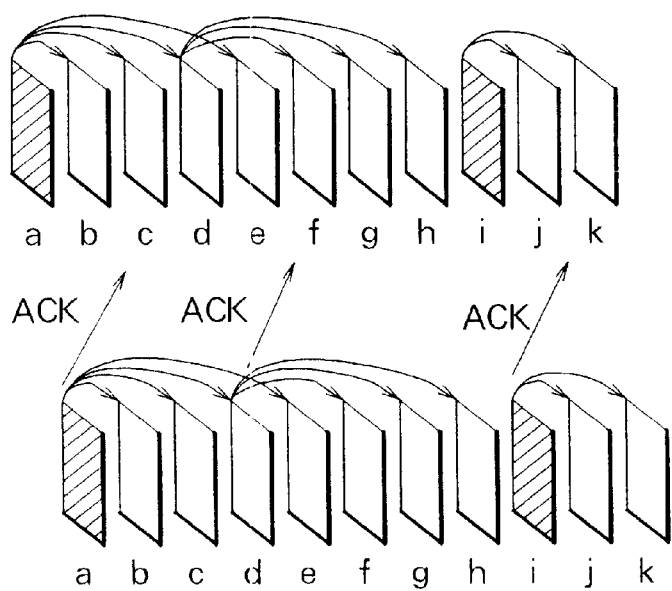
FIG. 4 shows another example of inter-frame coding relationships in the first embodiment.

FIG. 4 illustrates a case in which the moving-picture decoder returns a positive acknowledgment signal for frame d, but because of slower coding, slower decoding, or a slower transmission speed, the moving-picture coder 300 receives this positive acknowledgment signal after the coding of frame e has already begun. Frame e is therefore coded and decoded with reference to the existing reference frame (a). The reference frame is then changed to frame d, and the next frames (f, g, and h) are coded and decoded with reference to frame d.

Figure 5:
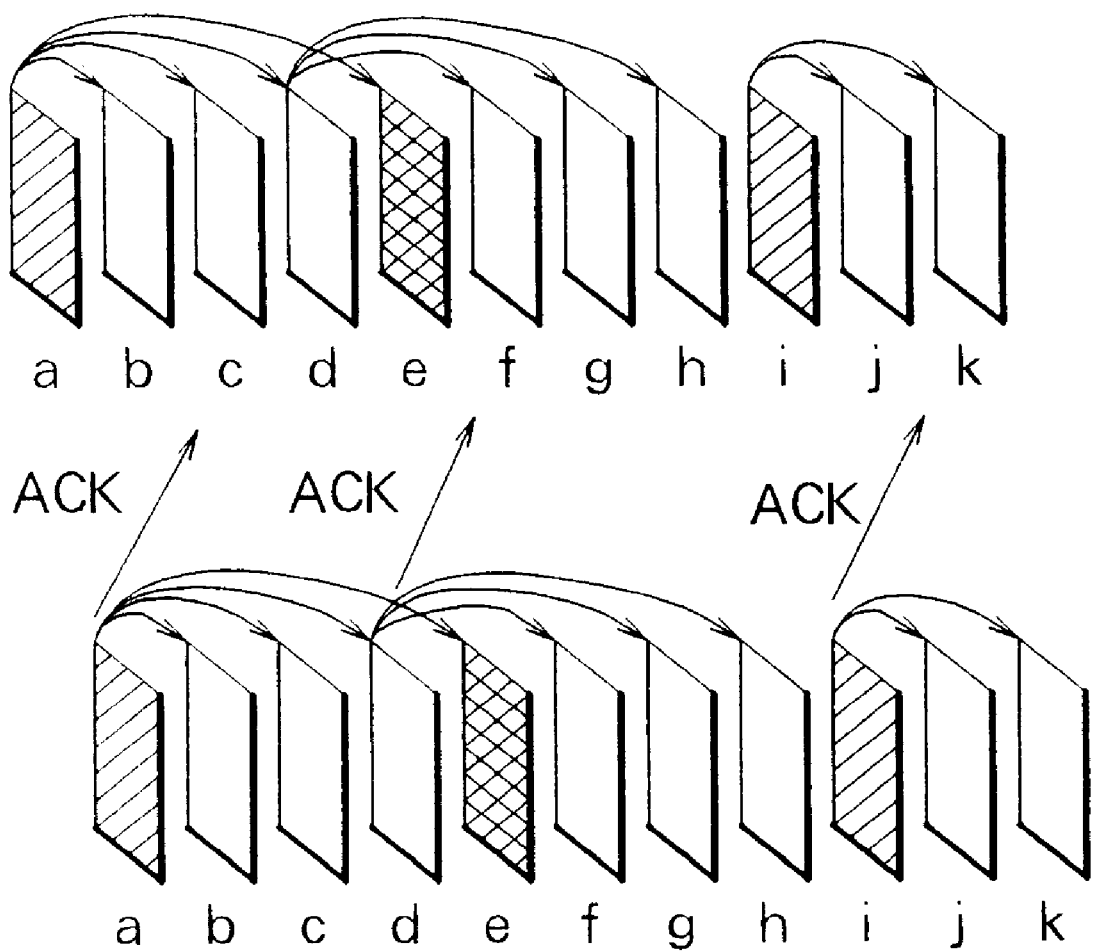
FIG. 5 shows an example of frame dropout in the first embodiment.

FIG. 5 illustrates a case of frame dropout. Frames b, c, d, and e are coded with reference to the first I-frame (a). Frames b to d are decoded successfully, and a positive acknowledgment signal is returned for frame d. The coded data of frame e are dropped or damaged in transmission, as indicated by the X-mark in the drawing. As a result, the coded data either are not received, or are received but cannot be decoded successfully, as indicated by cross-hatching. This does not affect the following frames f, g, and h, which are coded and decoded successfully with reference to the positively acknowledged frame d. The moving-picture decoder 400 does not have to wait for the next I-frame (i) in order to resume decoding after the dropout of frame e.

If the user watching the moving picture output by the moving-picture output unit 408 notices undesirable picture deterioration, due to an undetected error, for example, he or she can press a button or perform a similar operation that sends a refresh command to the refresh signal transmitting unit 409. A refresh signal is then transmitted to the moving-picture coder 300, forcing the next frame to be coded as an I-frame, thereby restoring good picture quality.

Figure 23:
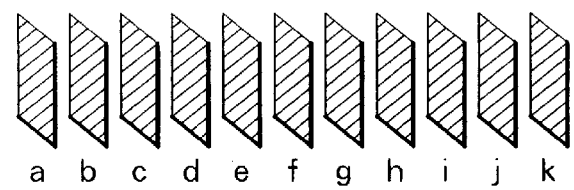
FIG. 23 illustrates intra-frame coding relationships in a second prior-art scheme.
Figure 24:
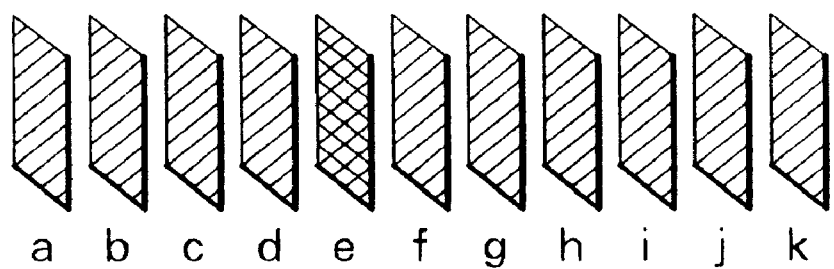
FIG. 24 shows an example of frame dropout in the second prior-art scheme.
Figure 25:
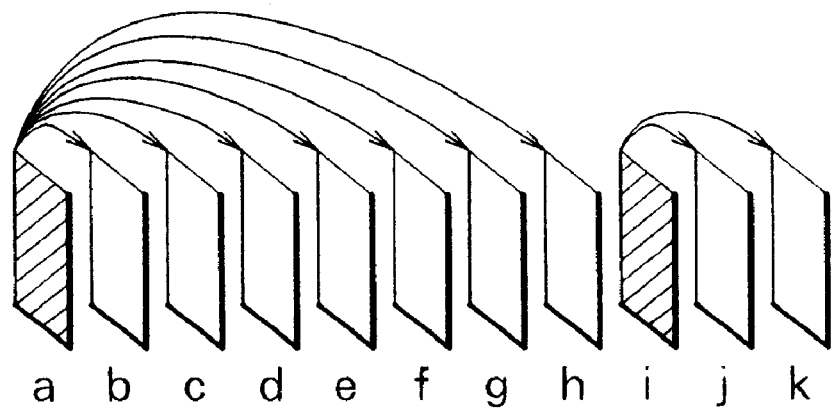
FIG. 25 illustrates inter-frame coding relationships in a third prior-art scheme.

In the first embodiment, dropout of a P-frame never prevents the decoding of subsequent frames, because only positively acknowledged P-frames can become reference frames. Differing from the prior art of FIG. 23, decoding can continue without waiting for the arrival of the next I-frame. At the same time, when a P-frame is successfully decoded and positively acknowledged, it can be used as a reference frame for coding subsequent frames, thereby reducing the temporal distance between the coded and reference frames, and improving the data compression ratio as compared with the prior art shown in FIG. 26.

Figure 22:
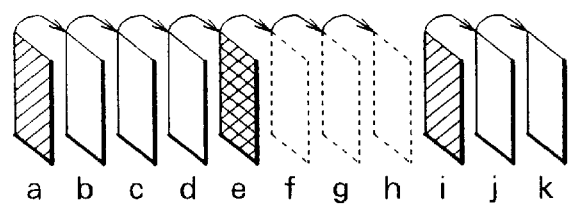
FIG. 22 shows an example of frame dropout in the first prior-art scheme.

In particular, when system conditions permit substantially all frames to be transmitted and decoded successfully, if the coded data size threshold for sending an acknowledgment signal is set at a sufficiently low level, the data compression performance of the first embodiment will approach that of the scheme illustrated in FIG. 22, in which every frame is coded with reference to the preceding frame.

When channel conditions are less favorable, or the threshold is higher, positive acknowledgment signals will be less frequent, reference frame updates will take place less often, and the data compression ratio will be reduced accordingly. The first embodiment still achieves a higher data compression ratio than in the prior-art scheme of FIG. 26, however, while providing the same protection against frame dropouts.

The first embodiment thus allows the data compression to vary according to channel conditions, enabling the transmission system to take advantage of good channel conditions to achieve high compression ratios, while maintaining good picture quality under even adverse channel conditions.

Figure 6:
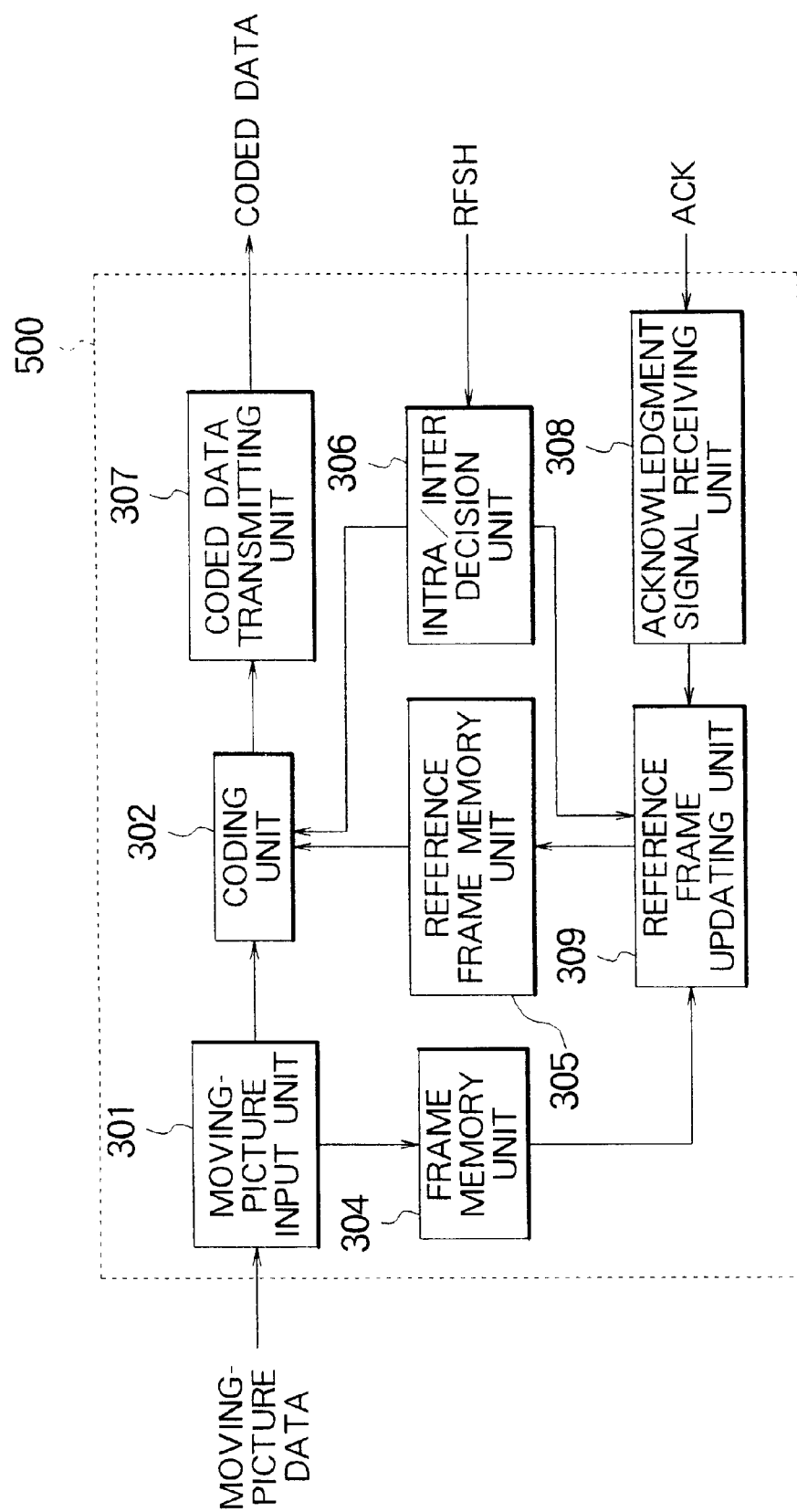
FIG. 6 is a block diagram showing a variation of the moving-picture coder in the first embodiment.

FIG. 6 illustrates a variation of the first embodiment in which the moving-picture coder 500 has no decoding unit. Other elements of the coder are the same as in FIG. 1, and have the same reference numerals. The operation of this variation is as described above, except that the moving-picture input unit 301 writes each received frame directly into the frame memory unit 304. Besides simplifying the configuration and operation of the moving-picture coder 500, this variation has advantages related to the accuracy of motion compensation. The disadvantage is that the moving-picture coder and moving-picture decoder do not code and decode P-frames with reference to exactly the same data.

As another variation, the decoding unit 303 in FIG. 1 or moving-picture input unit 301 in FIG. 6 can be adapted to write I-frame data directly into the reference frame memory unit 305, instead of having the data first written into the frame memory unit 304, then copied to the reference frame unit 305 by the reference frame updating unit 309. This arrangement simplifies the operation of the moving-picture coder.

As still another variation, the reference frame memory unit 305 and frame memory unit 304 can be combined into a w single frame memory unit, using a pointer to indicate which stored frame is the reference frame. By eliminating all copying of data from one memory unit to another, this arrangement further simplifies operation of the moving-picture coder, and reduces the memory requirements.

This combined frame memory unit can be managed as a ring buffer, with new data being overwritten on old data when the memory becomes full, thereby eliminating the need to delete old data. The same scheme can be applied to the frame memory unit 304 when not combined with the reference frame memory unit 305.

As yet another variation, the decoding unit 406 in the moving-picture decoder 400 in FIG. 2 can be adapted to evaluate the decoding process, and issue a refresh command to the refresh signal transmitting unit 409 whenever symptoms of poor picture quality or other decoding problems appear. The refresh signal transmitting unit 409 can then transmit refresh signals without requiring input from the user. A refresh signal can also be transmitted whenever an I-frame cannot be successfully decoded.

In a further variation, the moving-picture coder 300 divides each frame into a number of blocks, and codes each block separately. In a P-frame, each block is coded with reference to the corresponding block in the reference frame. A separate reference frame number can be maintained for each block, so that different blocks in the same frame can be coded with reference to different reference frames, and a separate acknowledgment signal can be sent for each block. Since a block is smaller than a frame, the probability of error is reduced, the overall reference frame update rate can be improved, the data compression ratio can be improved, and the effect of a dropout can be limited to a particular block in a frame.

Second embodiment

The second embodiment is identical to the first embodiment except that the moving-picture decoder 400 acknowledges every successfully decoded frame.

Figure 7:
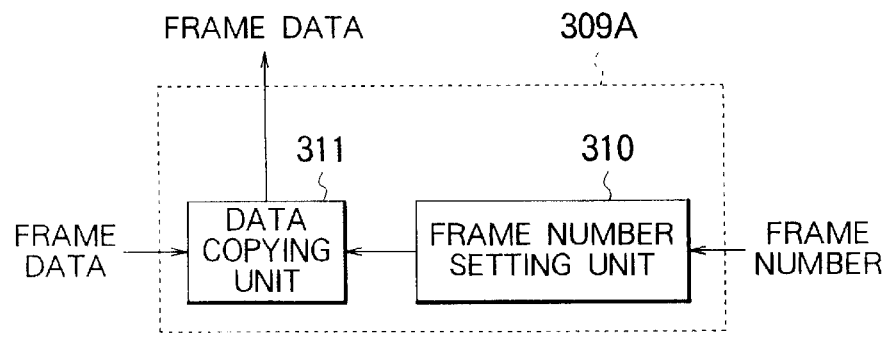
FIG. 7 is a block diagram of the reference frame updating unit in the moving-picture coder in the second embodiment.

FIG. 7 illustrates the internal structure of the reference frame updating unit 309A, which comprises a frame number setting unit 310 and a data copying unit 311. This reference frame updating unit 309A exemplifies a preferred internal structure of the reference frame updating unit 309 in the first embodiment.

The frame number setting unit 310 sets the frame numbers of frames for which positive acknowledgment is received by the acknowledgment signal receiving unit 308. These frame numbers are set in an internal work memory area (not visible), and passed to the data copying unit 311.

The data copying unit 311 copies the frames with numbers received from the frame number setting unit 310 from the frame memory unit 304 to the reference frame memory unit 305.

Next, the operation of the second embodiment will be described.

Figure 8:
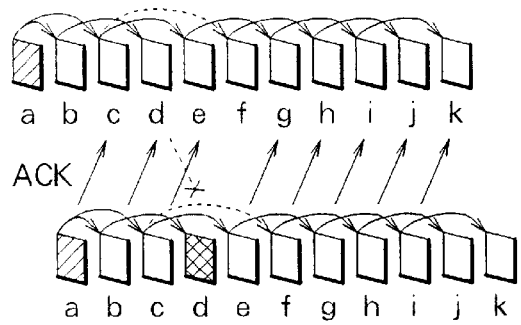
FIG. 8 shows an example of frame dropout in the second embodiment.

The reference frame updating unit 309A updates the reference frame according to the ACK signals transmitted from the moving-picture decoder 400. In FIG. 8, for example, the moving-picture decoder 400 acknowledges frames a, b, and c, as indicated by the arrows marked ACK. The moving-picture coder 300 receives the ACK signal for frame b after the coding of frame c has begun, so frame c is still coded with reference to frame a, but frame d is coded with reference to frame b. Similarly, frame e is coded with reference to frame c. The moving-picture decoder 400 decodes frames b and c with reference to frame a, frame d with reference to frame b, and frame e with reference to frame c.

Decoding of frame d is unsuccessful, so the moving-picture decoder 400 does not transmit an ACK signal for frame d. The moving-picture coder 300 therefore does not change the reference frame when coding frame f, but continues to use frame c as the reference frame. The moving-picture decoder 400 is thus able to decode frame f.

Frame e was successfully decoded and acknowledged, so frame g is coded with reference to frame e. Frame g can also be successfully decoded.

In the second embodiment, as in the first embodiment, the dropout of frame d has no effect on the decoding of subsequent frames, which can be decoded successfully without waiting for the next I-frame. The degradation of picture quality resulting from the dropout is minimized. The data compression ratio is also good, as frames c, d, e, g, and h are all coded with reference to the frame two frames before, and frame f is coded with reference to the frame only three frames before. The use of frame c instead of frame d as a reference frame for frame f will normally affect the data compression ratio only slightly.

Figure 9:
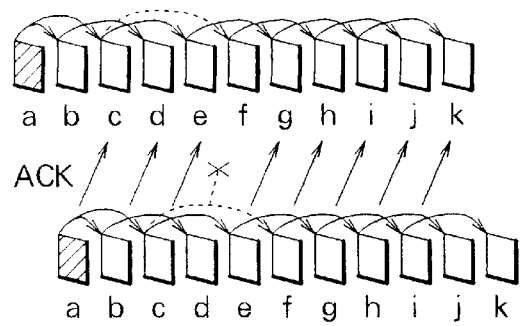
FIG. 9 shows an example of acknowledgment signal dropout in the second embodiment.

FIG. 9 shows an example of a dropout on the channel by which the ACK signal is transmitted from the moving-picture decoder 400 to the moving-picture coder 300. In this example, frame d is successfully decoded, but the corresponding ACK signal is lost en route. The moving-picture coder 300 reacts in the same way as in FIG. 8, by coding frame f with reference to frame c, frame g with reference to frame e, and so on. All of these frames can be successfully decoded, and the data compression ratio is the same as in FIG. 8.

The second embodiment accordingly has a high tolerance for dropouts of signals and data traveling in both directions between the coder and decoder.

Third embodiment

The third embodiment differs from the preceding embodiments in that the moving-picture decoder 400 transmits negative acknowledgment (NACK) signals instead of positive acknowledgment signals. A negative acknowledgment signal is transmitted when a frame is dropped or uncorrectably damaged in transmission. The negative acknowledgment signal includes the frame number of the frame that was not received, or was received with uncorrectable errors.

Aside from this difference, the moving-picture decoder 400 in the third embodiment operates in the same way as in the first embodiment, with the configuration shown in FIG. 2.

The moving-picture coder 300 has the configuration shown in FIG. 1, but the operation of the reference frame updating unit differs.

Figure 10:
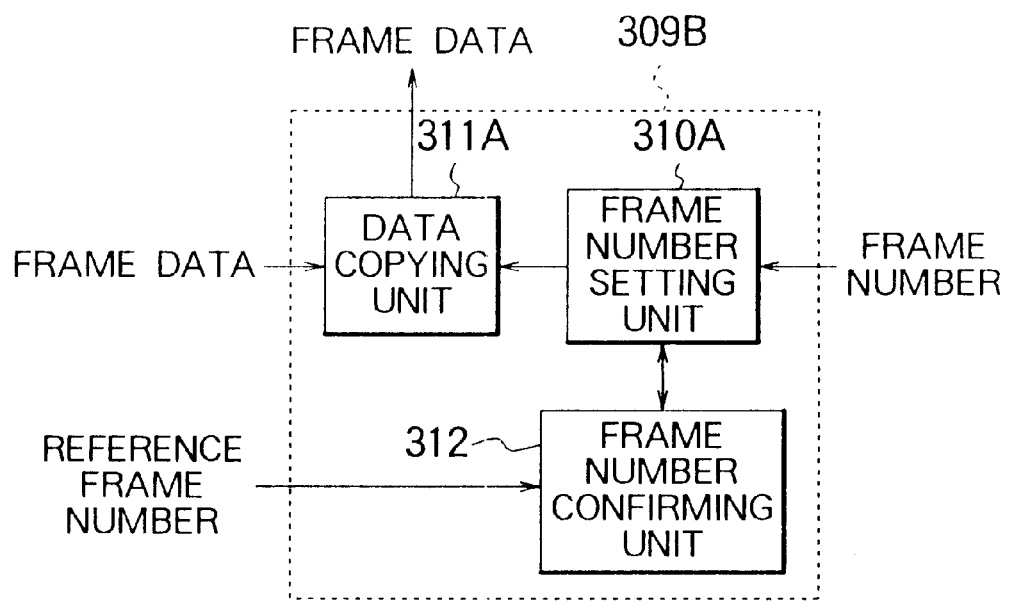
FIG. 10 is a block diagram of the reference frame updating unit in the moving-picture coder in the third embodiment.

FIG. 10 illustrates the internal structure of the reference frame updating unit 309B in the third embodiment, the suffix B indicating that this structure differs from the structure in the second embodiment. The component elements are a frame number setting unit 310A, a data copying unit 311A, and a frame number confirming unit 312, the suffixes A also indicating differences from the second embodiment.

The frame number setting unit 310A supplies the frame numbers of negatively acknowledged frames, received from the acknowledgment signal receiving unit 308, to the frame number confirming unit 312, and receives from the frame number confirming unit 312 in return a most recent confirmed frame number. The frame number setting unit 310A sets each most recent confirmed frame number in an internal memory (not visible), and passes these most recent confirmed frame numbers to the data copying unit 311A.

Upon receiving a negatively acknowledged frame number from the frame number setting unit 310A, the frame number confirming unit 312 searches among the frame numbers stored in the frame memory unit 304 to find the most recent frame number that is older than the frame number received from the frame number setting unit 310A, and has not been negatively acknowledged. This frame number is returned to the frame number setting unit 310A as the most recent confirmed frame number.

The data copying unit 311A normally copies each frame from the frame memory unit 304 to the reference frame memory unit 305 as soon as that frame is written into the frame memory unit 304 by the decoding unit 303 in FIG. 1, before the coding unit 302 begins coding the next frame. Upon receiving a most recent confirmed frame number from the frame number setting unit 310A, however, the data copying unit 311A copies the frame with that frame number from the frame memory unit 304 to the reference frame memory unit 305.

Other parts of the moving-picture coder 300 operate as in the first embodiment, except that frame data are not deleted from the frame memory unit 304 whenever a new reference frame is copied into the reference frame memory unit 305. In the absence of a negative acknowledgment signal, frame data are retained in the frame memory unit 304 for a certain length of time, preferably as long as possible.

Next, the operation of the third embodiment will be described with reference to FIG. 11.

As long as the moving-picture coder 300 does not receive a negative acknowledgment signal, the reference frame updating unit 309B assumes that all transmitted frames have been decoded successfully, and keeps updating the reference frame to the most recently coded frame. Normally, therefore, every frame is coded with reference to the immediately preceding frame, as indicated by the solid arrows at the top of FIG. 11. Frames b, c, d, and e in FIG. 11 are coded in this way.

Frames a, b, and c are decoded successfully, but frame d is dropped or damaged in transmission. The moving-picture decoder 400 returns a negative acknowledgment signal (NACK). This NACK signal arrives at the moving-picture coder 300 while the coding unit 302 is coding frame e with reference to frame d. As soon as the coding unit 302 has finished referring to frame d, the reference frame updating unit 309B updates the reference frame by copying frame c, the most recent frame before frame d that has not been negatively acknowledged, from the frame memory unit 304 to the reference frame memory unit 305. Frames d and e can be deleted from the frame memory unit 304 at this point, because it is known that the moving-picture decoder 400 was unable to decode frame d and will be unable to decode frame e.

Figure 11:
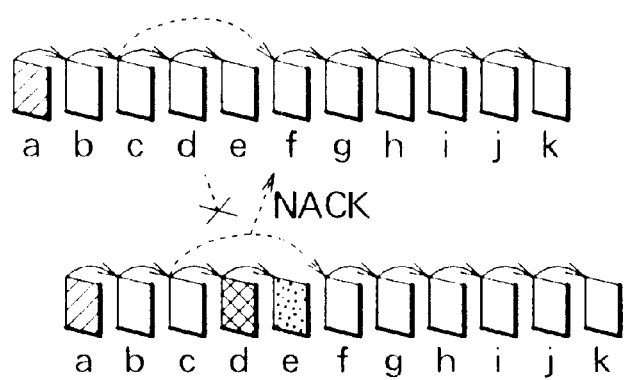
FIG. 11 shows an example of frame dropout in the third embodiment.

Frame f is now coded with reference to frame c, as indicated by the dotted arrow at the top of FIG. 11. The moving-picture decoder 400 is therefore able to decode frame f.

Frame e cannot be decoded because it was coded with reference to frame d, but frame e itself is not dropped or damaged in transmission. Accordingly, no negative acknowledgment signal is returned by the moving-picture decoder 400 for frame e while the moving-picture coder 300 is coding frame f.

The data copying unit 311B therefore copies frame f from the frame memory unit 304 to the reference frame memory unit 305, and frame g is coded with reference to frame f. Similarly, each of frames h, i, j, and k is coded with reference to the immediately preceding frame.

Compared with the second embodiment, the third embodiment normally achieves a higher data compression ratio, because each frame is coded with reference to the immediately preceding frame, instead of the frame two frames before. When a frame dropout occurs, one or more following frames may become undecodable (e.g. frame e in FIG. 11), but decoding will quickly become possible again without the need to wait for the next I-frame.

In multi-point transmission, the acknowledgment signal receiving unit 308 reports a frame as having been negatively acknowledged if it is negatively acknowledged by at least a certain number of receiving sites. For example, a frame can be reported as negatively acknowledged if it is negatively acknowledged by at least one site.

Fourth embodiment

The fourth embodiment is generally similar to the third embodiment, but the moving-picture decoder 400 transmits negative acknowledgment (NACK) signals for all frames that could not be decoded successfully, regardless of whether the cause was a transmission error or dropout in the frame itself, or a transmission error or dropout in a preceding frame. This scheme is preferable when the possibility of a dropout on the acknowledgment signal channel exists. Each NACK signal specifies both the frame number of the frame that could not be decoded, and a desired reference frame number. The desired reference frame number is the frame number of the most recent frame that was successfully decoded.

The following description will be confined to the structure and operation of the reference frame updating unit in the moving-picture coder.

Figure 12:
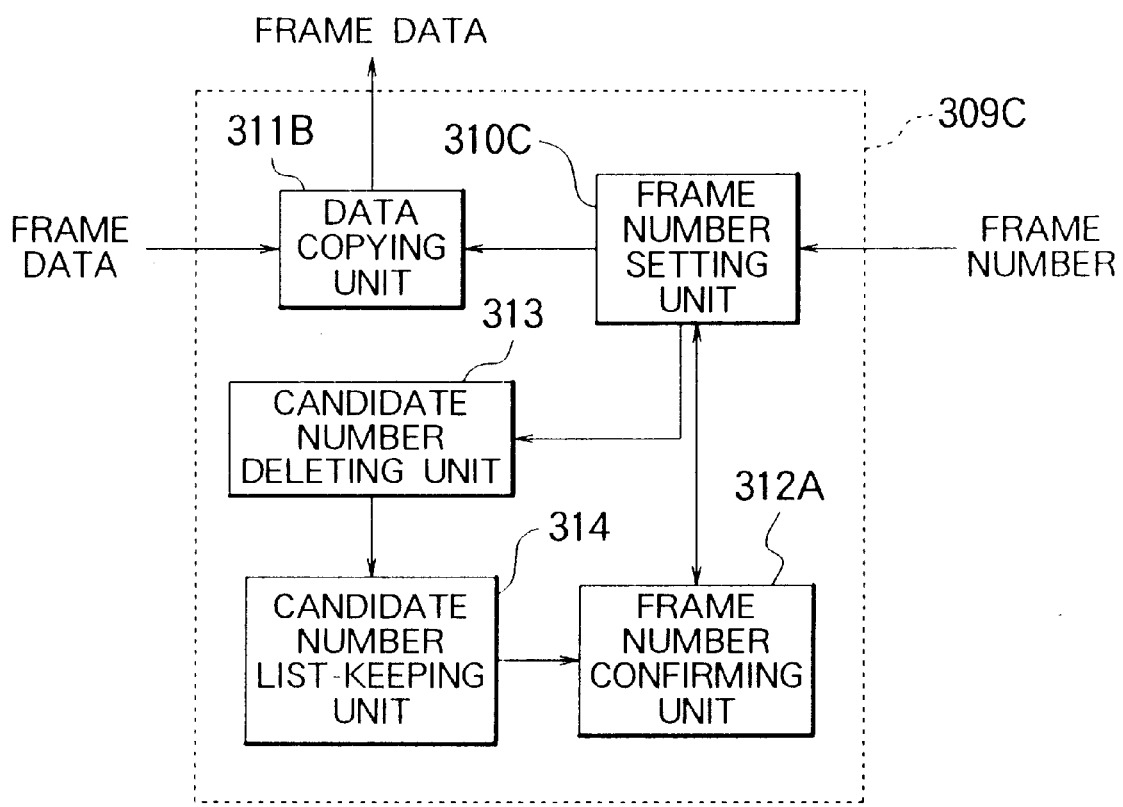
FIG. 12 is a block diagram of the reference frame updating unit in the moving-picture coder in the fourth embodiment.

FIG. 12 illustrates the internal structure of the reference frame updating unit 309C, the suffix C indicating that the structure differs from the third embodiment. The component elements are a frame number setting unit 310C, a data copying unit 311B, a frame number confirming unit 312A, a candidate number deleting unit 313, and a candidate number list-keeping unit 314.

The frame number setting unit 310C passes each negatively acknowledged frame number to the frame number confirming unit 312A. If the frame number confirming unit 312A confirms the negatively acknowledged frame number as described below, the frame number setting unit 310C passes the desired reference frame number to the data copying unit 311B and candidate number deleting unit 313. If the negatively acknowledged frame number is not confirmed, the frame number setting unit 310C takes no action.

Upon receiving a negatively acknowledged frame number from the frame number setting unit 310C, the frame number confirming unit 312A searches for the negatively acknowledged frame number in a candidate number list stored in the candidate number list-keeping unit 314, and notifies the frame number setting unit 310C as to whether the negatively acknowledged frame number is present on the candidate number list. A frame number reported to be present on the candidate number list is considered to have been confirmed.

Upon receiving a desired reference frame number, the candidate number deleting unit 313 deletes all frame numbers more recent than the desired reference frame number from the candidate number list. When a frame number is deleted from the candidate number list, the corresponding frame data can also be deleted from the frame memory unit 304.

The candidate number list-keeping unit 314 stores and updates the candidate number list. As each frame is coded by the coding unit 302, its frame number is added to the candidate number list. When a frame has been deleted from both the frame memory unit 304 and reference frame memory unit 305, its frame number is removed from the candidate number list.

The data copying unit 311B operates like the data copying unit 311A in the third embodiment, normally copying each frame from the frame memory unit 304 to the reference frame memory unit 305 as soon as the decoding unit 303 has decoded the frame. Upon receiving a desired reference frame number from the frame number setting unit 310C, however, the data copying unit 311B copies the frame with that frame number from the frame memory unit 304 to the reference frame memory unit 305.

Next, the operation of the fourth embodiment will be described with reference to FIGS. 13 and 14.

Figure 13:
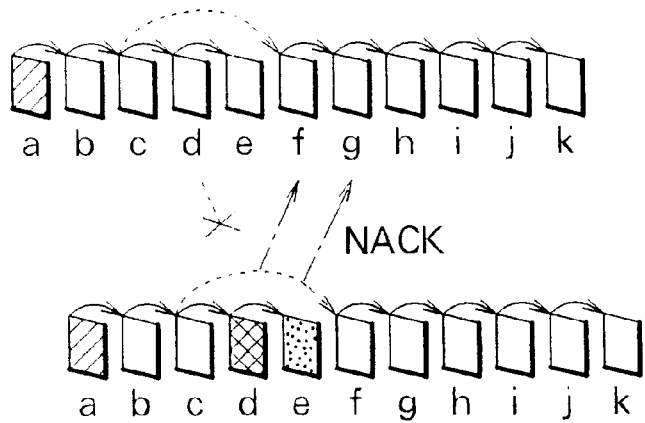
FIG. 13 shows an example of frame dropout in the fourth embodiment.

FIG. 13 illustrates the same situation as FIG. 11, in which frame d is lost in transmission, frames d and e cannot be decoded, and NACK signals are returned for these two frames d and e. Both NACK signals specify the frame number of frame c as a desired reference frame number.

Until these NACK signals arrive, the reference frame updating unit 309C assumes that all frames have been successfully decoded, and updates the reference frame at every frame. Frames b to e are therefore all coded with reference to the immediately preceding frame.

When the reference frame updating unit 309C receives the negative acknowledgment of frame d, frames a to d have been coded and transmitted and are already on the candidate number list, and frame e is currently being coded. The frame number confirming unit 312A confirms that frame d is on the candidate number list, so the frame number setting unit 310C passes the frame number of frame c to the data copying unit 311B and candidate number deleting unit 313. When the coding of frame e is completed, the data copying unit 311 copies frame c from the frame memory unit 304 to the reference frame memory unit 305, and the candidate number deleting unit 313 deletes the frame numbers of frames d and e from the candidate number list. Frame d is deleted from the frame memory unit 304. Frame e is preferably not written into the frame memory unit 304; if written, however, it is immediately deleted.

Frame f is coded with reference to frame c. During the coding of frame f, the reference frame updating unit 309C receives a negative acknowledgment for frame e, which could not be decoded because it was coded with reference to the missing frame d. The frame number confirming unit 312A searches for frame e on the candidate list, but cannot find it because it has been deleted by the candidate number deleting unit 313 as noted above. Since the negatively acknowledged frame e is not confirmed by the frame number confirming unit 312A, the frame number setting unit 310C does not supply any frame numbers to the data copying unit 311B and the candidate number deleting unit 313. When frame f has been coded it is transmitted to the moving-picture decoder 400 and added to the candidate number list, and the data copying unit 311B copies frame f immediately into the reference frame memory 305.

Frame g is therefore coded with reference to the immediately preceding frame f. The coding of subsequent frames continues in this manner.

Figure 14:
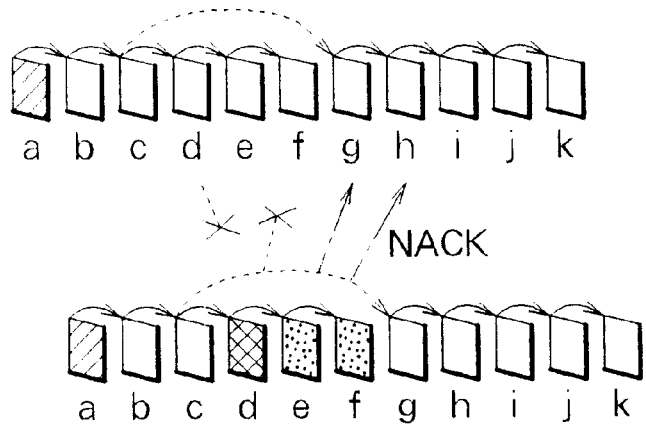
FIG. 14 shows an example of frame dropout followed by acknowledgment signal dropout in the fourth embodiment.

FIG. 14 illustrates a case in which a negative acknowledgment signal is transmitted but fails to arrive. As before, frame d is dropped or damaged in transmission, making frames d and e undecodable. This time, however, the NACK signal for frame d is also lost in transmission, so the reference frame updating unit 309C fails to realize that frame d and could not be decoded, and continues with processing as usual, coding frame f with reference to frame e. Frames a to e are all placed on the candidate number list.

The moving-picture decoder 400 transmits another NACK signal for frame e, accompanied by the frame number of frame c as a desired reference frame number, and this NACK signal is received at the moving-picture coder 300. The data copying unit 311B copies frame c from the frame memory unit 304 into the reference frame memory unit 305, and the candidate number deleting unit 313 deletes all frame numbers more recent than frame c (frame numbers d, e, and f) from the candidate number list. Frame g is coded with reference to frame c.

The moving-picture decoder 400 transmits a further NACK signal for frame f, again accompanied by frame number c as a desired reference frame number. Since frame number f has been deleted from the candidate number list, however, the reference frame updating unit 309C ignores this NACK signal, and copies frame g, rather than frame c, from the frame memory unit 304 to the reference frame memory unit 305. Frame h can thus be coded with reference to frame g.

Due to the loss of both frame d and its negative acknowledgment signal, three frames (d, e, and f) cannot be decoded, but the system recovers nevertheless. Frame g and the subsequent frames can all be decoded successfully, so a lengthy episode of picture degradation is avoided. Moreover, all frames except frame g are coded with reference to the immediately preceding frame, so a high data compression ratio is maintained.

The difference between the third and fourth embodiments is that by having the frame number confirming unit 312 check whether negatively acknowledged frames are present on the candidate number list, and ignoring the NACK signal if the negatively acknowledged frame number is not on the candidate number list, the fourth embodiment avoids unnecessarily retaining an old reference frame in response to repeated NACK signals. In FIG. 13, that is, frame g is coded with reference to frame c, whereas in the third embodiment (FIG. 11), frame g was coded with reference to frame c. When a frame dropout occurs, the fourth embodiment can accordingly achieve a better data compression ratio than can the third embodiment. This advantage of the fourth embodiment becomes increasingly important with increasing round-trip transmission time between the moving-picture coder 300 and decoder 400.

As a variation of the fourth embodiment, the moving-picture decoder 400 can omit the desired reference frame numbers from the NACK signals, and the moving-picture coder 300 can treat the last preceding frame that was not negatively acknowledged as the desired reference frame. This variation is suitable when the NACK signal transmission channel is highly reliable.

As another variation, the moving-picture decoder 400 can transmit both ACK and NACK signals, and the reference frame updating unit 309C in the moving-picture coder 300 can treat the most recent frame number for which an ACK signal was received as the desired reference frame number.

Fifth embodiment

The transmission system in the fifth embodiment sends a positive or negative acknowledgment signal for every frame, and adjusts the reference frame update mode adaptively, in response to channel conditions.

Under favorable channel conditions, the reference frame number is normally updated at every frame, but is set back when a negative acknowledgment is received, as in the third and fourth embodiments. This mode of operation will be referred to as NACK mode.

Under unfavorable channel conditions, the reference frame number is updated only when a positive acknowledgment is received, as in the first and second embodiments. This mode of operation will be referred to as ACK mode.

The moving-picture coder accordingly has a channel assessing unit and a mode switching unit, in addition to the reference frame updating unit.

Figure 15:
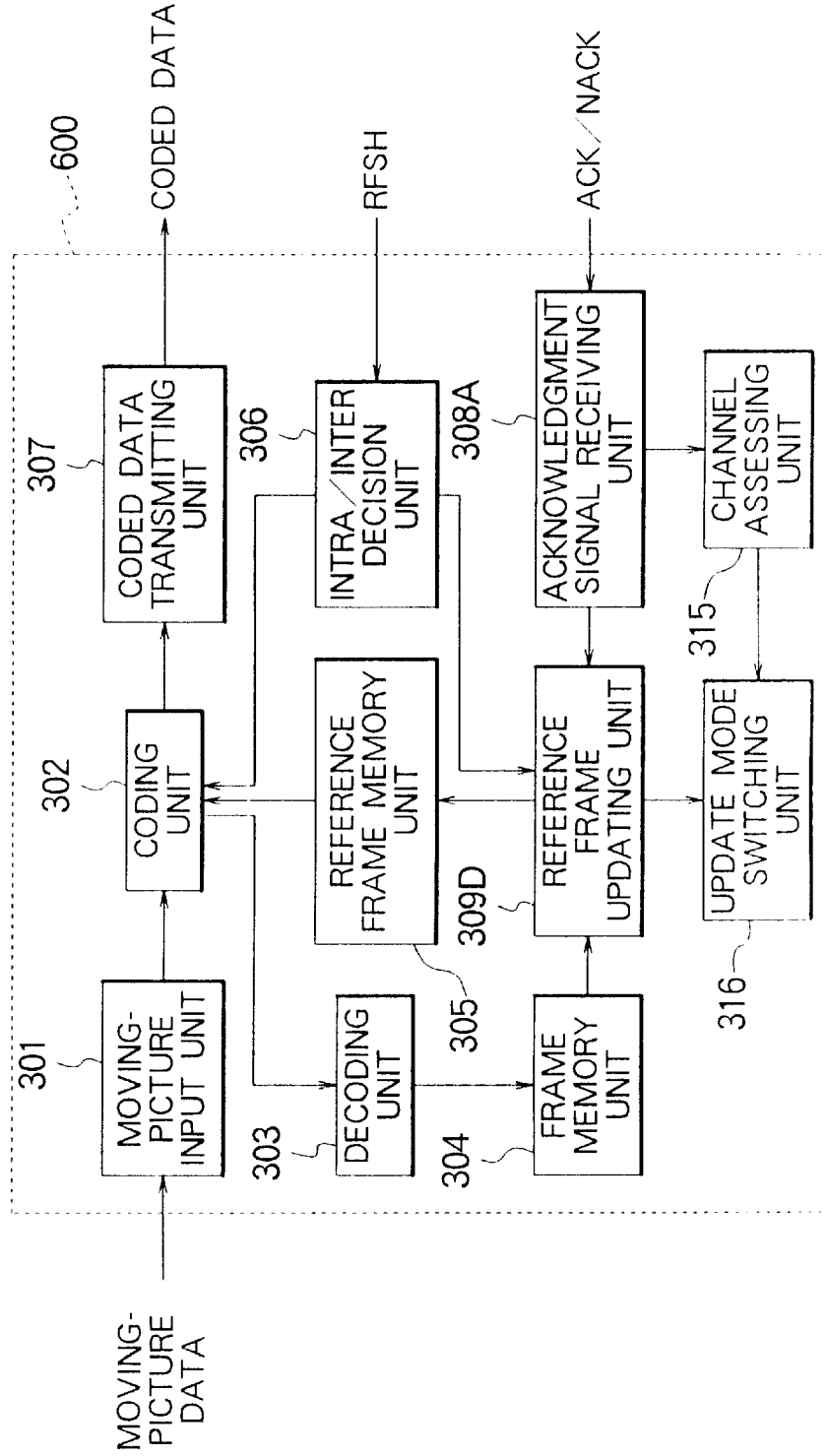
FIG. 15 is a block diagram of the moving-picture coder in the fifth embodiment.

FIG. 15 shows the configuration of the moving-picture coder 600 in the fifth embodiment, using the same reference numerals as in FIG. 1 for identical elements, and reference numerals with letter suffixes for similar elements. The following description will focus on the elements which differ from or were not present in the first embodiment. These elements include the acknowledgment signal receiving unit 308A, reference frame updating unit 309D, channel assessing unit 315, and update mode switching unit 316.

The acknowledgment signal receiving unit 308A receives acknowledgment signals, and passes the positive or negative acknowledgment information to the reference frame updating unit 309D and channel assessing unit 315. If an acknowledgment signal fails to arrive within a certain time, the acknowledgment signal receiving unit 308A regards the relevant frame as having been negatively acknowledged.

In multi-point transmission, the acknowledgment signal receiving unit 308A receives acknowledgment signals from each destination site, calculates the frame numbers of the frames that were positively acknowledged by at least a certain number of sites (preferably all sites, and treats other frame numbers as having been negatively acknowledged.

The reference frame updating unit 309D updates the reference frame responsive to notifications received from the intra/inter decision unit 306 and acknowledgment signal receiving unit 308A, in the update mode designated by the update mode switching unit 316.

In ACK mode, upon receiving positive acknowledgment for a particular frame number from the acknowledgment signal receiving unit 308A, the reference frame updating unit 309D copies the corresponding frame data from the frame memory unit 304 to the reference frame memory unit 305. Data preceding that number may be deleted from the frame memory unit 304 at this time. No action is taken in response to a negative acknowledgment.

In NACK mode, the reference frame updating unit 309D normally copies each frame from the frame memory unit 304 to the reference frame memory unit 305 just before the coding unit 302 begins coding the next frame. When a negative acknowledgment is received from the acknowledgment signal receiving unit 308A, however, the most recent positively acknowledged frame is copied from the frame memory unit 304 to the reference frame memory unit 305, thus setting the reference frame back. Information identifying the most recent positively acknowledged frame is maintained in the reference frame updating unit 309D and updated whenever a positive acknowledgment is received from the acknowledgment signal receiving unit 308A. Frames with frame numbers older than the most recent positively acknowledged frame number may be deleted from the frame memory unit 304 at this time.

Upon receiving an intra-frame coding notification from the intra/inter decision unit 306, the reference frame updating unit 309 copies the data of the current frame (I-frame) from the frame memory unit 304 to the reference frame memory unit 305, and deletes all frame data from the frame memory unit 304.

The channel assessing unit 315 assesses channel quality according to the acknowledgment signals received from the acknowledgment signal receiving unit 308A, and notifies the update mode switching unit 316 of the result of the assessment. In the following description there will be only two assessment levels: good and bad. Channel quality is assessed as bad if, for example, M or more of the N most recent frames were negatively acknowledged, and as good if fewer than M of these N frames were negatively acknowledged (M and N being positive integers such that $N \geq M$).

Other assessment criteria can be used. For example, channel quality can be assessed as bad when L consecutive frames are negatively acknowledged, where L is a suitable positive integer.

The update mode switching unit 316 switches the update mode according to the assessment made by the channel assessing unit 315. The mode can be switched to NACK mode when the assessment result is good for a first number of consecutive frames, for example, and to ACK mode when the assessment result is bad for a second number of consecutive frames.

Figure 16:
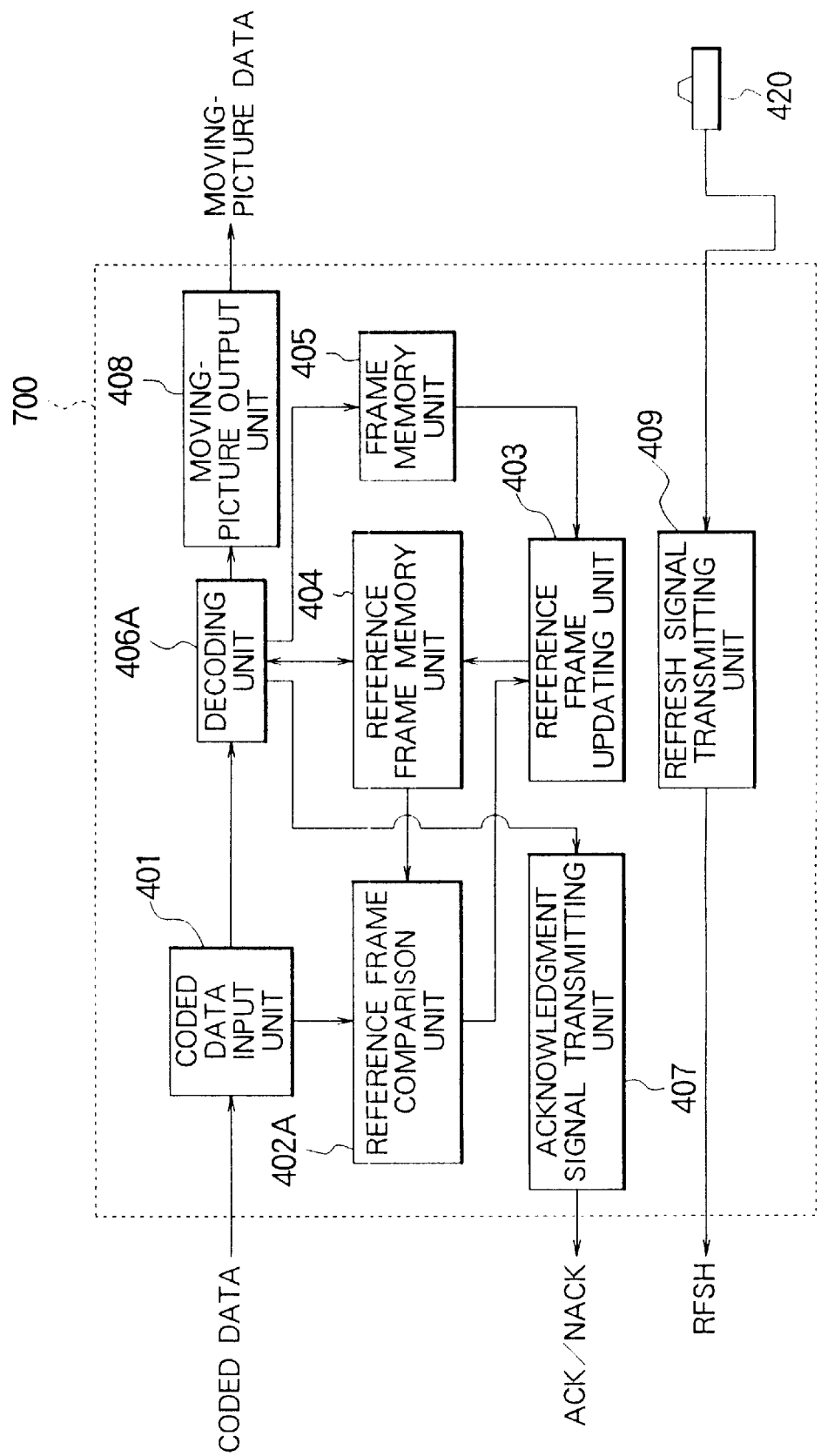
FIG. 16 is a block diagram of the moving-picture decoder in the fifth embodiment.

FIG. 16 illustrates the configuration of the moving-picture decoder 700 in the fifth embodiment, using the same reference numerals as in FIG. 2 for identical elements, and reference numerals with letter suffixes for similar elements. The configuration of the moving-picture decoder of the present embodiment is basically the same as in the first embodiment. The functions and operation of some of the elements differ, however; these differences will be described below.

The reference frame comparison unit 402A compares the reference frame number received with each frame and the reference frame number recorded in the reference frame memory unit 404, and issues a reference frame update request to the reference frame updating unit 403 if the reference frame numbers differ. Whereas the first embodiment only updated the reference frame number in the forward direction, to a newer frame number, the fifth embodiment also allows the reference frame number to be updated in the backward direction, to an older frame number.

The decoding unit 406A decodes the received frame data as in the first embodiment, writing decoded I-frames into the reference frame memory unit 404, and decoded P-frames into the frame memory unit 405. The decoding unit 406A also checks for decoding errors, using a cyclic redundancy check, for example, and informs the acknowledgment signal transmitting unit 407 whether each frame was successfully or unsuccessfully received.

Next, the operation of the fifth embodiment will be described. The description will focus on operations in the moving-picture coder 300, which differ depending on whether the ACK mode or NACK mode is selected. To simplify the description, channel quality will be assessed as good whenever a positive acknowledgment signal is received, and as bad whenever a negative acknowledgment signal is received. The operating mode is switched from NACK to ACK when the channel quality is assessed as bad for even one frame, and from ACK to NACK when the channel quality is assessed as good for four consecutive frames.

Figure 17:
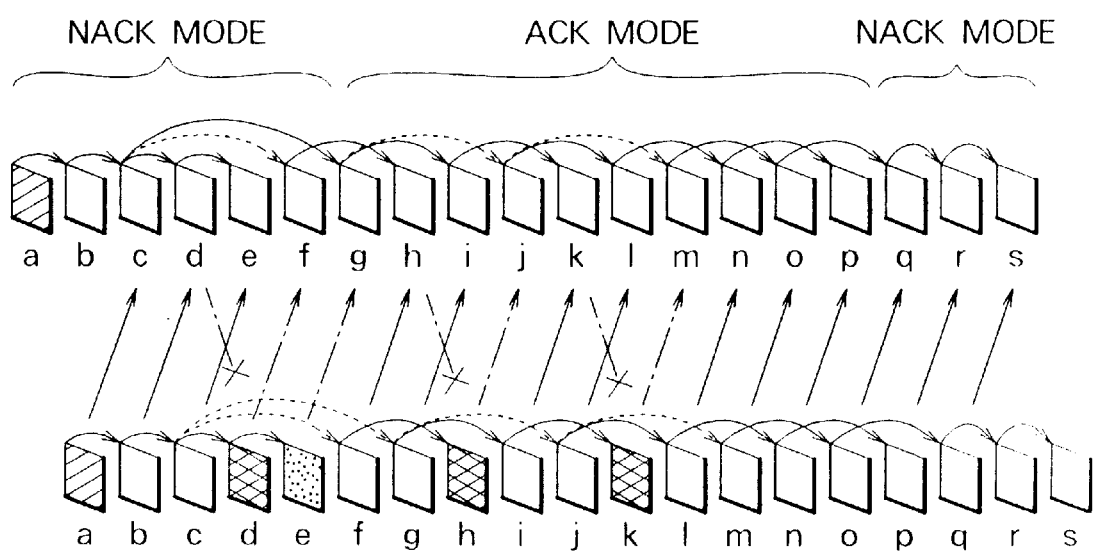
FIG. 17 shows examples of frame dropout in the fifth embodiment.

Referring to FIG. 17, the moving-picture coder 300 initially operates in the NACK mode, coding each frame with reference to the preceding frame. Frames a, b, and c are successfully decoded, but a dropout occurs at frame d. When the NACK signal, indicated by a dot-dash arrow, reporting this dropout is received, it is too late to prevent frame e from being coded with reference to frame d, but for frame f, the reference frame number is set back to frame c, the most recent frame that has been positively acknowledged. Frame f is thus coded with reference to frame c.

The moving-picture decoder 400 cannot decode frame e, but can decode frame f. The moving-picture decoder 400 therefore sends a negative acknowledgment, indicated in FIG. 17 by another dot-dash arrow, for frame e, and a positive acknowledgment, indicated by a solid arrow, for frame f.

In the meantime, the moving-picture coder 300 has switched to ACK mode, because of the negative acknowledgment of frame d. The NACK signal for frame e is therefore ignored. The reference frame is left unchanged, and frame g is coded with reference to frame c.

While frame g is being coded, the positive acknowledgment signal for frame f is received. The next frame h is therefore coded with reference to frame f. Similarly, the positive acknowledgment signal received for frame g causes frame i to be coded with reference to frame g.

Another dropout occurs at frame h. The NACK signal for frame h is received before the coding of frame j, so the reference frame number is not updated when frame j is coded. Frame j is coded, and successfully decoded, with reference to frame g. During the coding of frame j, an ACK signal is received for frame i, so the next frame k is coded with reference to frame i.

A further dropout occurs at frame k. The resulting NACK signal causes frame m to be coded, and successfully decoded, with reference to frame j, while the positive acknowledgment of frame I causes frame n to be coded, and successfully decoded, with reference to frame 1.

Frames l, m, n, and o are all successfully decoded. Their positive acknowledgment signals cause the moving-picture coder 300 to switch back to NACK mode after coding frame q. Frame r is therefore coded with reference to frame q, and frame s with reference to frame r.

Under good channel conditions, when there are no dropouts, the reference frame number is updated at every frame, so a good data compression ratio is achieved even if there is a large round-trip transmission delay. If an occasional dropout occurs, the next frame or frames may become undecodable, because the system is operating in NACK mode, but the resulting degradation of picture quality will tend to be subjectively disregarded, because the transmission is dominated by long dropout-free intervals with good picture quality.

If channel conditions deteriorate, the moving-picture coder 300 switches from NACK to ACK mode and begins using only positively acknowledged frames as reference frames, so that the dropout of one P-frame does not prevent other frames from being decoded. In this mode, the system can tolerate consecutive dropouts without having such dropouts lead to long runs of undecodable frames. Picture degradation is thus limited to the unavoidable degradation caused by the dropouts themselves. Under poor channel conditions, the fifth embodiment offers a picture-quality improvement of about one to five decibels over the third and fourth embodiments, to say nothing of the prior art in FIG. 22.

Following a dropout in either ACK or NACK mode, successful decoding of P-frames can resume without waiting for the next I-frame.

The data compression ratio adapts sensitively to channel conditions. As channel quality decreases, the moving-picture coder 300 operates for an increasing proportion of the time in ACK mode, and the data compression ratio decreases accordingly, but as long as any time is spent in NACK mode, the data compression ratio will be better than in the first or second embodiment.

These advantages of the fifth embodiment are achieved by using the existing acknowledgment signals to assess channel quality. There is, accordingly, no need to transmit new information expressly for the purpose of channel assessment.

Another advantage of the fifth embodiment is that operations on the receiving side do not depend on the reference frame updating mode. Only the moving-picture coder 300 has to switch modes, and there is no need to transmit a mode notification signal to the receiving side. Regarding this last point, if a mode notification signal were to be transmitted, strong error-detection and correction measures would have to be taken to ensure that the signal was received. The fifth embodiment thus saves not only the channel bandwidth needed to transmit a mode notification signal, but also the bandwidth that would be needed for error protection.

Next, several variations of the fifth embodiment will be described.

In one variation, each frame is divided into blocks, and a separate reference frame number is provided for each block. This scheme has already been described as a variation of the first embodiment. If this scheme is employed in the fifth embodiment, the channel can be assessed on the basis of acknowledgment signals received for blocks in the same position in a series of consecutive frames.

In another variation, in multi-point transmission, the acknowledgment signal receiving unit 308A passes the individual acknowledgment signals received from different destination sites to the channel assessing unit 315, instead of simply notifying the channel assessing unit 315 as to whether a frame was decoded successfully at all sites or not. This variation enables the channel assessing unit 315 to assess channel conditions more sensitively.

In still another variation, more than two channel assessment levels are provided, with a separate operating mode for each level. A very bad level, for example, can be added to the good and bad levels described above. When the very bad level is recognized, the quantization step size in the coding process can be increased, to reduce the amount of coded data per frame and raise the percentage of frames that can be decoded successfully.

In yet another variation, the moving-picture decoder 400 transmits only ACK signals. Failure to receive an ACK signal within a designated time is regarded as negative acknowledgment. This variation is suitable for transmission channels with a predictable round-trip transmission time.

In still another variation, mode information is added as flag information to the data transmitted by the moving-picture coder 300. The moving-picture decoder 400 can use this information to delete unnecessary data from the frame memory unit 405. In the ACK mode, for example, data older than the current reference frame can be deleted.

In yet another variation, the moving-picture decoder 400 decides when to switch modes. From the acknowledgment signals, the moving-picture coder 300 can determine only whether each frame (or block) had an uncorrectable error, but the moving-picture decoder 400 can determine the rate of correctable errors, and therefore evaluate channel conditions more sensitively.

In still another variation, I-frames are written by the decoding unit 303 directly into the reference frame memory unit 305, instead of being copied from the frame memory unit 304 to the reference frame memory unit 305 by the reference frame updating unit 309D.

In yet another variation, the reference frame memory unit 305 and frame memory unit 304 are combined into a single memory unit, in which the reference frame is managed by a pointer.

In still another variation, the channel assessing unit 315 has a plurality of criteria for assessing the state of the channel. The channel state is assessed as good when it is good by all of these criteria, and as bad when it is bad by any one (or more) of the criteria. Alternatively, the state may be assessed as good when it is good by any one of the criteria, and bad when it is bad by all of the criteria, or the assessment may be changed only when the change is indicated by at least a certain number of the criteria.

Sixth embodiment

The sixth embodiment is similar to the fifth embodiment, but also enables mode-switching to be controlled by the person operating the moving-picture coder. The configuration of the coder thus differs slightly from the fifth embodiment. The configuration and operation of the moving-picture decoder are the same as in the fifth embodiment, and will not be described.

Figure 18:
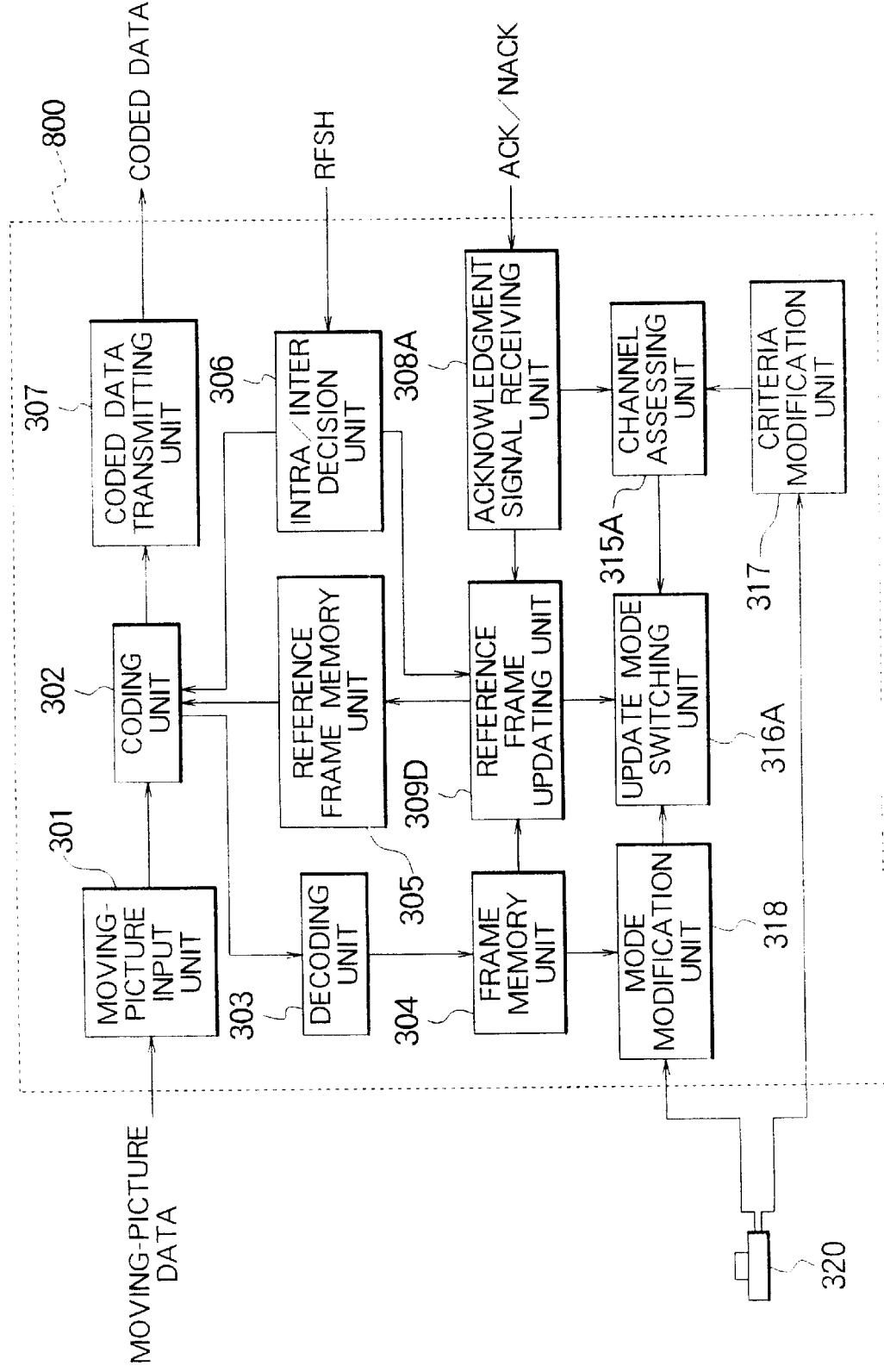
FIG. 18 is a block diagram of the moving-picture coder in the sixth embodiment.

FIG. 18 is a block diagram of the moving-picture coder 800 in the sixth embodiment, using the same reference numerals for elements that are identical or equivalent to elements in the fifth embodiment (FIG. 15). Descriptions of these elements will be omitted.

The criteria modification unit 317 receives a criteria modification command from the human operator, determines the appropriate new channel assessment criteria from this command, and notifies the channel assessing unit 315A.

The channel assessing unit 315A, in addition to having the functions of the channel assessing unit 315 described in the fifth embodiment, is adapted to change the channel assessment criteria to the criteria furnished by the criteria modification unit 317.

The mode modification unit 318 receives a mode modification command from the human operator, and commands the update mode switching unit 316A to switch to the designated mode.

The update mode switching unit 316A, in addition to having the functions of the update mode switching unit 316 described in the fifth embodiment, is adapted to switch modes in response to commands received from the mode modification unit 318. The reference frame updating unit 309D then operates in the commanded mode until, for example, a reset signal is received, whereupon the update mode switching unit 316A resumes switching the update mode in response to channel conditions.

Next, the operation of the sixth embodiment will be described. The description will be confined to operations performed in response to input from the human operator of the moving-picture coder 800. Other operations take place as in the fifth embodiment.

The human operator of the moving-picture coder 800 can control the reference frame updating process through two types of operations.

One type of operation changes the criteria by which the state of the transmission channel is assessed. An example of this type of operation changes the criteria for a bad assessment from, for instance, negative acknowledgment of at least three of the last ten frames to negative acknowledgment of at least seven of the last twenty frames. In this way the operator can influence the reference frame updating mode while still allowing the moving-picture coder to adapt to changing channel conditions.

The other type of operation forces the moving-picture coder 800 to operate in a designated mode, e.g. ACK mode or NACK mode, regardless of channel conditions.

In addition to providing the benefits of the fifth embodiment, the sixth embodiment gives the human operator the option of exercising direct or indirect control over the reference frame updating mode, hence over picture quality and the data compression ratio. This allows the operator to take action according to personal preferences, or according to specific channel conditions. The sixth embodiment is also useful in testing and evaluating different assessment criteria and reference frame updating modes.

Seventh embodiment

The seventh embodiment is also similar to the fifth embodiment, but gives the human user of the moving-picture decoder the options enjoyed by the operator of the moving-picture coder in the sixth embodiment. Both the moving-picture coder and moving-picture decoder differ slightly from the fifth embodiment.

Figure 19:
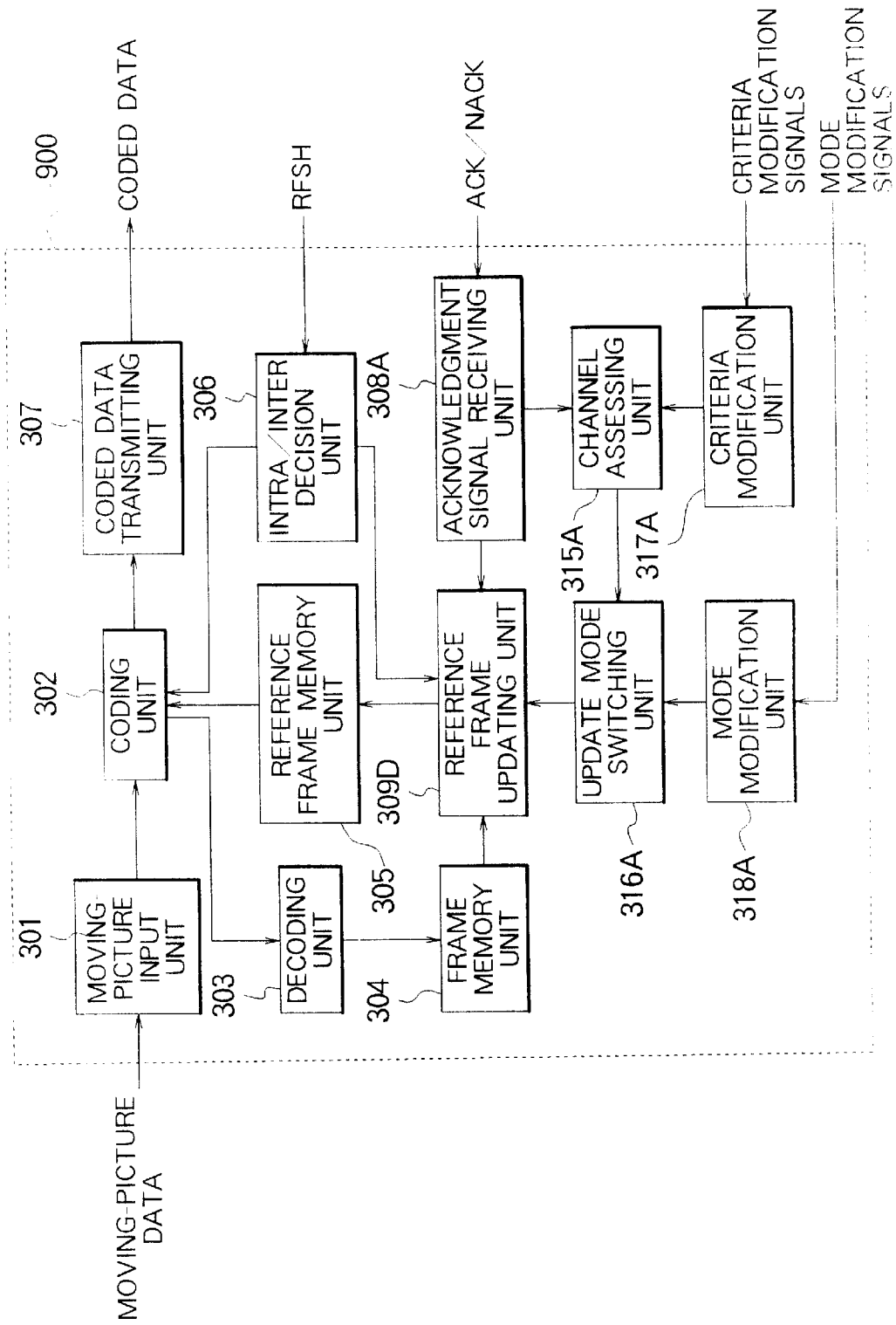
FIG. 19 is a block diagram of the moving-picture coder in the seventh embodiment.

FIG. 19 illustrates the configuration of the moving-picture coder 900, using the same reference numerals as in FIG. 18 for elements that are the same as in the sixth embodiment. The following description will be confined to the differing elements.

The criteria modification unit 317A is similar to the criteria modification unit 317 of the sixth embodiment, but receives criteria modification signals transmitted from the moving-picture decoder 1000, rather than commands input from an input device attached to the moving-picture coder 900.

The mode modification unit 318A is similar to the mode modification unit 318 of the sixth embodiment, but receives mode modification signals transmitted from the moving-picture decoder 1000, rather than commands input from an input device attached to the moving-picture coder 900.

Figure 20:
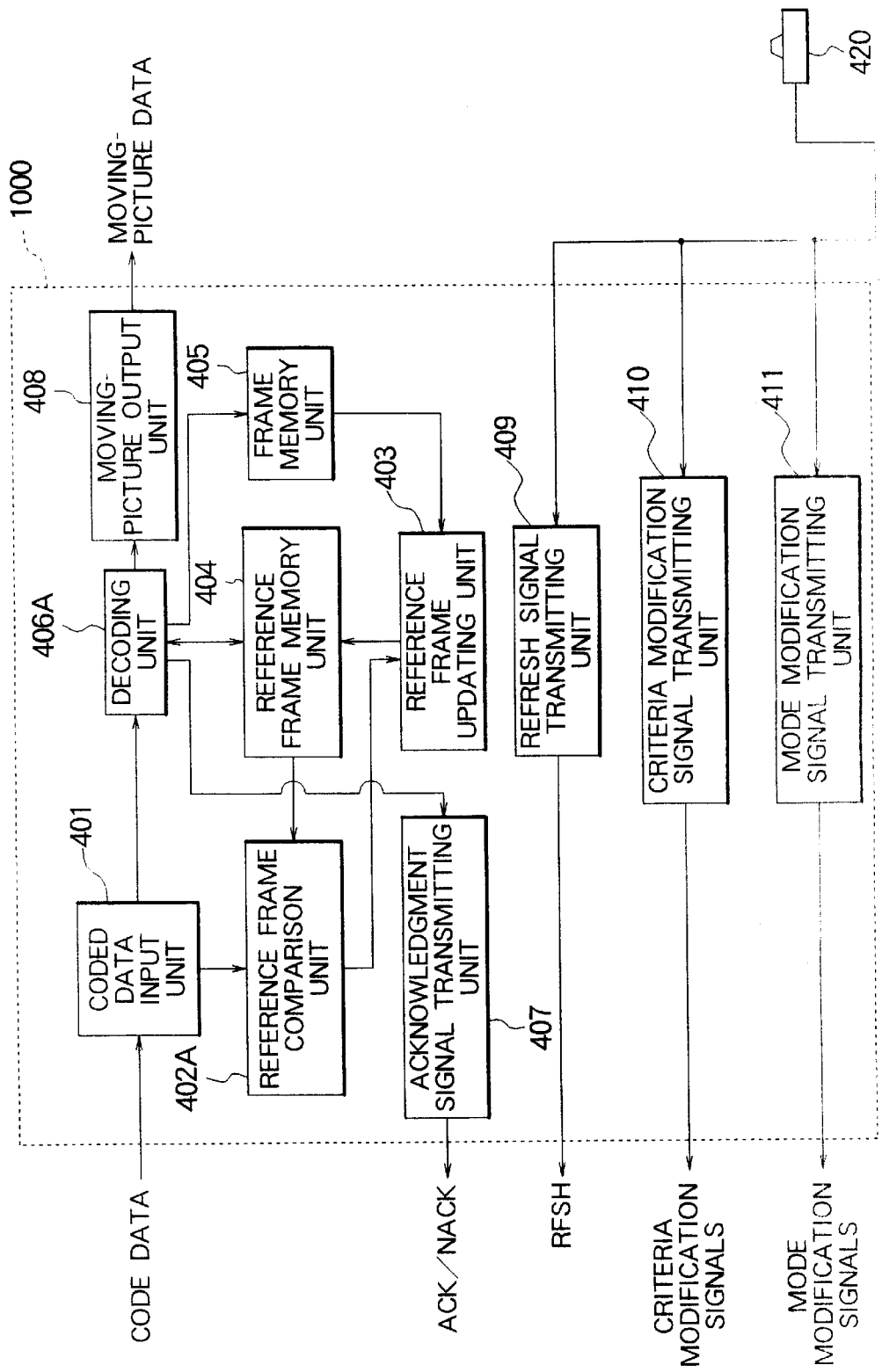
FIG. 20 is a block diagram of the moving-picture decoder in the seventh embodiment.
Figure 21:
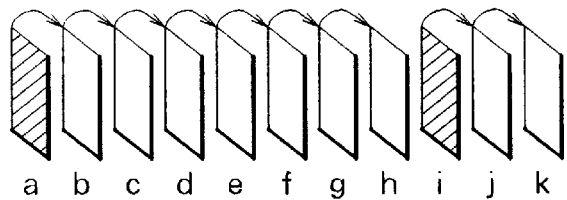
FIG. 21 illustrates inter-frame coding relationships in a first prior-art scheme.

FIG. 20 illustrates the configuration of the moving-picture decoder 1000, using the same reference numerals as in FIG. 16 for identical elements. The following description will be confined to the additional elements.

The criteria modification signal transmitting unit 410 receives criteria modification commands input by a human user through the input device 420, and transmits corresponding criteria modification signals to the moving-picture coder 900 via the transmission channel.

The mode modification signal transmitting unit 411, similarly, receives mode modification commands input by the user through the input device 420, and transmits corresponding mode modification signals to the moving-picture coder 900 via the transmission channel.

Next, the operation of the seventh embodiment will be described. The description will be confined to the operations performed in response to commands input by the user of the moving-picture decoder 1000.

This user can perform three types of operations. One type of operation inputs a refresh command, as in the first embodiment. The other two types of operations input criteria modification commands and mode modification commands, these commands being similar to the corresponding commands input by the operator of the moving-picture coder 900 in the sixth embodiment.

Any one of these three operations causes the moving-picture decoder 1000 to transmit a corresponding signal to the moving-picture coder 900. A refresh signal forces the moving-picture coder 900 to code and transmit an I-frame. The criteria modification and mode modification signals are processed as were the criteria modification and mode modification commands in the sixth embodiment.

The seventh embodiment provides the same advantages as the fifth embodiment, with the additional advantage of giving the user of the moving-picture decoder 1000 more control over picture quality. A particular advantage of the seventh embodiment is that criteria modification commands and mode modification commands can be issued in response to the picture quality actually perceived by the user of the moving-picture decoder 1000.

As in the sixth embodiment, the ability to specify the channel assessment criteria and reference frame updating mode directly is useful in testing and evaluating system performance under different criteria and modes.

As a variation, the sixth and seventh embodiments can be combined, giving the human users at both ends the option of exercising control over the assessment criteria and reference frame update mode.

Although the invention has been described as transmitting moving-picture data, it can be applied to any type of data coded by using both intra-frame and inter-frame coding methods. If a frame is divided into separately-coded blocks, the invented reference frame update methods can be applied separately to each block, as described above. The word "frame" can then be interpreted to refer to one block, e.g. to one part of a picture.

Numerous variations of the embodiments have been described above, but those skilled in the art will recognize that still further variations are possible within the scope of the invention as claimed below.

What is claimed is:

1. A coder in a transmitting device for coding a series of frames and transmitting resulting coded data to a plurality of decoders in respective receiving devices over respective transmission channels, comprising:

receiving means for receiving acknowledgement signals from said plurality of decoders;

memory means for concurrently storing a plurality of frames from among said series of frames;

reference frame updating means using said acknowledgement signals to select, from among the plurality of frames stored in said memory means, a reference frame that has been positively acknowledged by at least a certain number of said decoders, the coded data of which was successfully decoded by said decoders;

coding means coupled to said memory means, for performing inter-frame coding with reference to the reference frame selected by said reference frame updating means, thereby generating coded data; and transmitting means coupled to said coding means, for transmitting said coded data and a reference frame number indicating said reference frame to said plurality of decoders.

2. A coder in a transmitting device for coding a series of frames and transmitting resulting coded data to a plurality of decoders in respective receiving devices over respective transmission channels, comprising:

receiving means for receiving acknowledgement signals from said plurality of decoders;

memory means for concurrently storing a plurality of frames from among said series of frames;

reference frame updating means using said acknowledgement signals to select, from among the plurality of frames stored in said memory means, a reference frame that has not been negatively acknowledged by at least a certain number of said decoders, the coded data of which was successfully decoded by said decoders;

coding means coupled to said memory means, for performing inter-frame coding with reference to the reference frame selected by said reference frame updating means, thereby generating coded data; and transmitting means coupled to said coding means, for transmitting said coded data and a reference frame number indicating said reference frame to said plurality of decoders.

3. A coder in a transmitting device for coding a series of frames and transmitting resulting coded data to a decoder in a receiving device over a transmission channel, comprising:

receiving means for receiving acknowledgement signals from said decoder;

memory means for concurrently storing a plurality of frames from among said series of frames;

reference frame updating means using said acknowledgement signals to select, from among the plurality of frames stored in said memory means, a reference frame the coded data of which was successfully decoded by said decoder;

coding means coupled to said memory means, for performing inter-frame coding with reference to the reference frame selected by said reference frame updating means, thereby generating coded data; and transmitting means coupled to said coding means, for transmitting said coded data and a reference frame number indicating said reference frame to said decoder;

wherein said acknowledgment signals comprise positive acknowledgment signals designating successfully decoded frames, and when each one of said positive acknowledgement signals is received, said reference frame updating means selects, as said reference frame, the frame designated by said one of said positive acknowledgment signals.

4. A coder in a transmitting device for coding a series of frames and transmitting resulting coded data to a decoder in a receiving device over a transmission channel, comprising:

receiving means for receiving acknowledgement signals from said decoder;

memory means for concurrently storing a plurality of frames from among said series of frames;

reference frame updating means using said acknowledgement signals to select, from among the plurality of frames stored in said memory means, a reference frame the coded data of which was successfully decoded by said decoder;

coding means coupled to said memory means, for performing inter-frame coding with reference to the reference frame selected by said reference frame updating means, thereby generating coded data; and transmitting means coupled to said coding means, for transmitting said coded data and a reference frame number indicating said reference frame to said decoder;

wherein said acknowledgement signals comprise negative acknowledgement signals designating unsuccessfully decoded frames, and when each one of said negative acknowledgement signals is received, said reference frame updating means selects, as said reference frame, a frame coded before the frame designated by said one of said negative acknowledgement signals.

5. A coder in a transmitting device for coding a series of frames and transmitting resulting coded data to a decoder in a receiving device over a transmission channel, comprising:

receiving means for receiving acknowledgement signals from said decoder;

memory means for concurrently storing a plurality of frames from among said series of frames;

reference frame updating means using said acknowledgement signals to select, from among the plurality of frames stored in said memory means, a reference frame the coded data of which was successfully decoded by said decoder;

coding means coupled to said memory means, for performing inter-frame coding with reference to the reference frame selected by said reference frame updating means, thereby generating coded data; and transmitting means coupled to said coding means, for transmitting said coded data and a reference frame number indicating said reference frame to said decoder;

wherein said acknowledgment signals comprise negative acknowledgment signals designating unsuccessfully decoded frames and desired reference frames, and when each one of said negative acknowledgment signals is received, said reference frame updating means selects, as said reference frame, the desired reference frame designated by said one of said negative acknowledgment signals.

6. A coder in a transmitting device for coding a series of frames and transmitting resulting coded data to a decoder in a receiving device over a transmission channel, comprising:

receiving means for receiving acknowledgement signals from said decoder;

memory means for concurrently storing a plurality of frames from among said series of frames;

reference frame updating means using said acknowledgement signals to select, from among the plurality of frames stored in said memory means, a reference frame the coded data of which was successfully decoded by said decoder;

coding means coupled to said memory means, for performing inter-frame coding with reference to the reference frame selected by said reference frame updating means, thereby generating coded data; and transmitting means coupled to said coding means, for transmitting said coded data and a reference frame number indicating said reference frame to said decoder;

wherein said reference frame updating means comprises a list-keeping unit for keeping a list of candidate reference frames, and adding the frames coded by said coding unit to said list of candidate reference frames; and a deleting unit for, when one of said acknowledgement signals designates a frame as having been unsuccessfully decoded, deleting the frame thus designated, and all more recent frames in said series of frames, from said list of candidate reference frames;

and wherein said reference frame updating means selects, as said reference frame, one of the frames on said list of candidate reference frames.

7. The coder of claim 6, wherein said acknowledgment signals comprise negative acknowledgment signals designating both a frame that could not be decoded successfully and a desired reference frame.

8. The coder of claim 7 wherein, if both said frame that could not be decoded successfully and said desired reference frame are present on said list of candidate reference frames, said reference frame updating means selects said desired reference frame as said reference frame.

9. The coder of claim 7 wherein, when said frame that could not be decoded successfully is not on said list of candidate reference frames, said reference frame updating means selects a most recent frame on said list of candidate reference frames as said reference frame.

10. A coder in a transmitting device for coding a series of frames and transmitting resulting coded data to a decoder in a receiving device over a transmission channel, comprising:

receiving means for receiving acknowledgement signals from said decoder;

memory means for concurrently storing a plurality of frames from among said series of frames;

reference frame updating means using said acknowledgement signals to select, from among the plurality of frames stored in said memory means, a reference frame the coded data of which was successfully decoded by said decoder;

coding means coupled to said memory means, for performing inter-frame coding with reference to the reference frame selected by said reference frame updating means, thereby generating coded data;

transmitting means coupled to said coding means, for transmitting said coded data and a reference frame number indicating said reference frame to said decoder;

assessing means for assessing quality of said transmission channel, based on said acknowledgement signals; and mode switching means coupled to said assessing means, for directing said reference frame updating means to select reference frames in different modes, responsive to said quality.

11. The coder of claim 10, wherein:

said assessing means assesses said quality by counting negatively acknowledged frames among a certain number of most recently transmitted frames.

12. The coder of claim 10, wherein said assessing means assesses said quality by counting consecutive negatively acknowledged frames.

13. The coder of claim 10, wherein said frames represent parts of pictures in a moving picture, and said assessing means assesses said quality by counting negatively acknowledged frames in identical positions in a certain number of consecutive pictures.

14. The coder of claim 10, wherein said assessing means assesses said quality according to a plurality of criteria.

15. The coder of claim 10, wherein said assessing means assesses said quality by making assessments of good and bad.

16. The coder of claim 15 wherein, when said quality is assessed as good, said mode switching means directs said reference frame updating means to select a most recently coded frame as said reference frame, unless a negative acknowledgment signal is received.

17. The coder of claim 15 wherein, when said quality is assessed as bad, said mode switching means directs said reference frame updating means to select, as said reference frame, only frames confirmed by said acknowledgment signals to have been decoded successfully.

18. The coder of claim 10, comprising a mode modifying means for receiving a mode command from a human user, and forcing said reference frame updating means to select said reference frame in a mode designated by said mode command.

19. The coder of claim 10, comprising a criteria modifying means for receiving a criteria modification command from a human user, and modifying criteria by which said assessing means assesses said quality, responsive to said criteria modification command.

20. A decoder in a receiving device for receiving, through a transmission channel, coded data from a coder in a transmitting device that performs inter-frame coding, and decoding said coded data to obtain a series of frames, comprising:

receiving means for receiving said coded data and reference frame numbers from said coder;

decoding means coupled to said receiving means, for decoding said coded data with reference to reference frames specified by said reference frame numbers; and an acknowledgement signal transmitter coupled to said decoding means, for transmitting acknowledgement signals, acknowledging respective frames, to said coder, said acknowledgement signals including frame numbers of said frames and indicating whether or not said decoder decoded said frames successfully;

wherein said acknowledgment signals comprise positive acknowledgment signals indicating that respective frames were successfully decoded.

21. A decoder in a receiving device for receiving, through a transmission channel, coded data from a coder in a transmitting device that performs inter-frame coding, and decoding said coded data to obtain a series of frames, comprising:

receiving means for receiving said coded data and reference frame numbers from said coder;

decoding means coupled to said receiving means, for decoding said coded data with reference to reference frames specified by said reference frame numbers; and an acknowledgement signal transmitter coupled to said decoding means, for transmitting acknowledgement signals, acknowledging respective frames, to said coder, said acknowledgement signals including frame numbers of said frames and indicating whether or not said decoder decoded said frames successfully;

wherein said acknowledgement signals comprise negative acknowledgment signals indicating that respective frames were not successfully received.

22. A decoder in a receiving device for receiving, through a transmission channel, coded data from a coder in a transmitting device that performs inter-frame coding, and decoding said coded data to obtain a series of frames, comprising:

receiving means for receiving said coded data and reference frame numbers from said coder;

decoding means coupled to said receiving means, for decoding said coded data with reference to reference frames specified by said reference frame numbers; and an acknowledgement signal transmitter coupled to said decoding means, for transmitting acknowledgement signals, acknowledging respective frames, to said coder, said acknowledgement signals including frame numbers of said frames and indicating whether or not said decoder decoded said frames successfully;

wherein said acknowledgement signals comprise negative acknowledgment signals indicating that respective frames were not successfully decoded.

23. A decoder in a receiving device for receiving, through a transmission channel, coded data from a coder in a transmitting device that performs inter-frame coding, and decoding said coded data to obtain a series of frames, comprising:

receiving means for receiving said coded data and reference frame numbers from said coder;

decoding means coupled to said receiving means, for decoding said coded data with reference to reference frames specified by said reference frame numbers; and an acknowledgement signal transmitter coupled to said decoding means for transmitting acknowledgement signals, acknowledging respective frames, to said coder, said acknowledgement signals including frame numbers of said frames and indicating whether or not said decoder decoded said frames successfully;

wherein said acknowledgment signals comprise positive acknowledgment signals indicating that respective frames were successfully decoded, and negative acknowledgments signals indicating that respective frames were not successfully received.

24. A decoder in a receiving device for receiving, through a transmission channel, coded data from a coder in a transmitting device that performs inter-frame coding, and decoding said coded data to obtain a series of frames, comprising:

receiving mean s for receiving said coded data and reference frame numbers from said coder;

decoding means coupled to said receiving means, for decoding said coded data with reference to reference frames specified by said reference frame numbers; and an acknowledgement signal transmitter coupled to said decoding means, for transmitting acknowledgement signals, acknowledging respective frames, to said coder, said acknowledgement signals including frame numbers of said frames and indicating whether or not said decoder decoded said frames successfully;

wherein said acknowledgement signals comprise negative acknowledgment signals indicating that respective frames were not successfully decoded, and each of said negative acknowledgment signals designates a desired reference frame, to be used by said coder for interframe coding of following frames.

25. A decoder in a receiving device for receiving, through a transmission channel, coded data from a coder in a transmitting device that performs inter-frame coding, and decoding said coded data to obtain a series of frames, comprising:

receiving means for receiving said coded data and reference frame numbers from said coder;

decoding means coupled to said receiving means, for decoding said coded data with reference to reference frames specified by said reference frame numbers; and an acknowledgement signal transmitter coupled to said decoding means, for transmitting acknowledgement signals, acknowledging respective frames, to said coder, said acknowledgement signals including frame numbers of said frames and indicating whether or not said decoder decoded said frames successfully;

wherein said coder assesses quality of said transmission channel according to certain criteria, and selects reference frames for use in inter-frame coding in a mode responsive to said quality, and said decoder also comprises criteria modification signal transmitting means for receiving input from a human user, and transmitting to said coder a corresponding signal commanding said coder to modify said criteria, responsive to said input.

26. A decoder in a receiving device for receiving, through a transmission channel, coded data from a coder in a transmitting device that performs inter-frame coding, and decoding said coded data to obtain a series of frames, comprising:

receiving means for receiving said coded data and reference frame numbers from said coder;

decoding means coupled to said receiving means, for decoding said coded data with reference to reference frames specified by said reference frame numbers; and an acknowledgement signal transmitter coupled to said decoding means, for transmitting acknowledgement signals, acknowledging respective frames, to said coder, said acknowledgement signals including frame numbers of said frames and indicating whether or not said decoder decoded said frames successfully;

wherein said coder assesses quality of said transmission channel according to certain criteria, and selects reference frames for use in inter-frame coding in a mode responsive to said quality, and said decoder also comprises mode modification signal transmitting means for receiving input from a human user, and transmitting to said coder a signal commanding said coder to modify said mode, responsive to said input.

27. A method of transmitting a series of frames representing a moving picture from a transmitting device to a plurality of receiving devices, comprising the steps of:

concurrently storing, at said transmitting device, a plurality of frames transmitted previously to said receiving devices;

coding at least some of said frames by inter-frame coding with reference to a reference frame, said reference frame being one of said frames transmitted previously;

transmitting coded data produced by the inter-frame coding of said frames, together with a reference frame number indicating said reference frame, from said transmitting device to said receiving devices;

decoding said coded data at said receiving devices with reference to the reference frame indicated by said reference frame number;

transmitting acknowledgement signals from said plurality of receiving devices to said transmitting device, said acknowledgement signals including frame numbers of said frames, and indicating whether or not said receiving device successfully decoded said frames; and selecting said reference frame at said transmitting device, using said acknowledgement signals to select, as said reference frame, a frame that at least one of said receiving devices decoded successfully.

28. The method claim 27, wherein said step of selecting said reference frame comprises:

selecting a frame that has been positively acknowledged by at least a certain number of said receiving devices.

29. The method claim 27, wherein said step of selecting said reference frame comprises:

selecting a frame that has not been negatively acknowledged by at least a certain number of said receiving devices.

30. A method of transmitting a series of frames representing a moving picture from a transmitting device to a receiving device, comprising the steps of:

concurrently storing, at said transmitting device, a plurality of frames transmitted previously to said receiving device;

coding at least some of said frames by inter-frame coding with reference to a reference frame, said reference frame being one of said frames transmitted previously;

transmitting coded data produced by the inter-frame coding of said frames, together with a reference frame number indicating said reference frame, from said transmitting device to said receiving device;

decoding said coded data at said receiving device with reference to the reference frame indicated by said reference frame number;

transmitting acknowledgement signals from said receiving device to said transmitting device, said acknowledgement signals including frame numbers of said frames, and indicating whether or not said receiving device successfully decoded said frames; and selecting said reference frame at said transmitting device, using said acknowledgement signals to select, as said reference frame, a frame that said receiving device decoded successfully;

wherein said acknowledgment signals comprise positive acknowledgment signals designating successfully decoded frames, and said step of selecting said reference frame comprises:

selecting a frame designated by one of said positive acknowledgment signals.

31. A method of transmitting a series of frames representing a moving picture from a transmitting device to a receiving device, comprising the steps of:

concurrently storing, at said transmitting device, a plurality of frames transmitted previously to said receiving device;

coding at least some of said frames by inter-frame coding with reference to a reference frame, said reference frame being one of said frames transmitted previously;

transmitting coded data produced by the inter-frame coding of said frames, together with a reference frame number indicating said reference frame, from said transmitting device to said receiving device;

decoding said coded data at said receiving device with reference to the reference frame indicated by said reference frame number;

transmitting acknowledgement signals from said receiving device to said transmitting device, said acknowledgement signals including frame numbers of said frames, and indicating whether or not said receiving device successfully decoded said frames; and selecting said reference frame at said transmitting device, using said acknowledgement signals to select, as said reference frame, a frame that said receiving device decoded successfully;

wherein said acknowledgement signals comprise negative acknowledgment signals designating unsuccessfully decoded frames, and said step of selecting said reference frame comprises:

selecting a frame coded before a frame designated by one of said negative acknowledgment signals.

32. A method of transmitting a series of frames representing a moving picture from a transmitting device to a receiving device, comprising the steps of:

concurrently storing, at said transmitting device, a plurality of frames transmitted previously to said receiving device;

coding at least some of said frames by inter-frame coding with reference to a reference frame, said reference frame being one of said frames transmitted previously;

transmitting coded data produced by the inter-frame coding of said frames, together with a reference frame number indicating said reference frame, from said transmitting device to said receiving device;

decoding said coded data at said receiving device with reference to the reference frame indicated by said reference frame number;

transmitting acknowledgement signals from said receiving device to said transmitting device, said acknowledgement signals including frame numbers of said frames, and indicating whether or not said receiving device successfully decoded said frames; and selecting said reference frame at said transmitting device, using said acknowledgement signals to select, as said reference frame, a frame that said receiving device decoded successfully;

wherein said acknowledgment signals comprise negative acknowledgment signals designating unsuccessfully decoded frames and desired reference frames, and said step of selecting said reference frame comprises:

selecting said desired reference frames as said reference frame.

33. A method of transmitting a series of frames representing a moving picture from a transmitting device to a receiving device, comprising the steps of:

concurrently storing, at said transmitting device, a plurality of frames transmitted previously to said receiving device;

coding at least some of said frames by inter-frame coding with reference to a reference frame, said reference frame being one of said frames transmitted previously;

transmitting coded data produced by the inter-frame coding of said frames, together with a reference frame number indicating said reference frame, from said transmitting device to said receiving device;

decoding said coded data at said receiving device with reference to the reference frame indicated by said reference frame number;

transmitting acknowledgement signals from said receiving device to said transmitting device, said acknowledgement signals including frame numbers of said frames, and indicating whether or not said receiving device successfully decoded said frames; and selecting said reference frame at said transmitting device, using said acknowledgement signals to select, as said reference frame, a frame that said receiving device decoded successfully;

wherein said step of selecting said reference frame comprises the further steps of keeping a list of candidate reference frames;

adding the frames coded by intra-frame coding and the frames coded by inter-frame coding to said list;

deleting from said list each frame that is negatively acknowledged;

simultaneously deleting from said list frames more recent than the frame that is negatively acknowledged; and selecting said reference frame from said list.

34. The method of claim 33, wherein said acknowledgment signals comprise negative acknowledgment signals designating both a frame that could not be decoded successfully and a desired reference frame.

35. The method of claim 34, wherein said step of selecting said reference frame comprises:

selecting said desired reference frame, if both said frame that could not be decoded successfully and said desired reference frame are present on said list.

36. The method of claim 34, wherein said step of selecting said reference frame comprises:

selecting a most recent frame on said list, if said frame that could not be decoded successfully is not on said list.

37. A method of transmitting a series of frames representing a moving picture from a transmitting device to a receiving device, comprising the steps of:

concurrently storing, at said transmitting device, a plurality of frames transmitted previously to said receiving device;

coding at least some of said frames by inter-frame coding with reference to a reference frame, said reference frame being one of said frames transmitted previously;

transmitting coded data produced by the inter-frame coding of said frames, together with a reference frame number indicating said reference frame, from said transmitting device to said receiving device;

decoding said coded data at said receiving device with reference to the reference frame indicated by said reference frame number;

transmitting acknowledgement signals from said receiving device to said transmitting device, said acknowledgement signals including frame numbers of said frames, and indicating whether or not said receiving device successfully decoded said frames;

assessing quality of said transmission channel; and selecting said reference frame at said transmitting device in different modes, responsive to said quality, using said acknowledgement signals to select, as said reference frame, a frame that said receiving device decoded successfully.

38. The method of claim 37, wherein said transmitting device performs said step of assessing quality, based on said acknowledgment signals.

39. The method of claim 38, wherein said step of assessing quality comprises:

counting negatively acknowledged frames during a certain interval.

40. The method of claim 38, wherein said step of assessing quality comprises:

counting consecutive negatively acknowledged frames.

41. The method of claim 38, wherein said frames represent parts of pictures in said moving picture, and said step of assessing quality comprises:

counting negatively acknowledged frames in identical positions in a certain number of consecutive pictures.

42. The method of claim 37, wherein said step of assessing quality comprises making assessments of good and bad.

43. The method of claim 42, wherein said step of selecting said reference frame comprises:

selecting a most recently coded frame, when said quality is assessed as good, unless a negative acknowledgment signal is received.

44. The method of claim 42, wherein said step of selecting said reference frame comprises:

selecting frames confirmed by said acknowledgment signals to have been decoded successfully, when said quality is assessed as bad.

45. The method of claim 37, comprising the further step of receiving a first command from a human user, specifying criteria by which said quality is to be assessed.

46. The method of claim 45, wherein said first command is received from a human user at said transmitting device.

47. The method of claim 45, wherein said first command is received from a human user at said receiving device.

48. The method of claim 37, comprising the further step of receiving a second command from a human user, specifying a mode of selecting said reference frame.

49. The method of claim 48, wherein said second command is received from a human user at said transmitting device.

50. The method of claim 48, wherein said second command is received from a human user at said receiving device, comprising the further step of:

transmitting said second command from said receiving device to said transmitting device.

51. The coder of claim 4, wherein, when each one of said negative acknowledgement signals is received, said reference frame updating means deletes the frame designated by said one of said negative acknowledgement signals, and all subsequent frames, from said memory means.

52. The coder of claim 6 wherein, when one of said acknowledgement signals designates a frame as having been unsuccessfully decoded, said deleting unit also deletes the frame thus designated, and all more recent frames in said series of frames, from said memory means.

53. The coder of claim 52, wherein said acknowledgement signals comprise negative acknowledgement signals designating both a frame that could not be decoded successfully and a desired reference frame.

54. The method of claim 31, comprising the further steps of:
storing said frames in memory means in said transmitting device, pending selection as said reference frame; and
deleting from said memory means the frame designated by said one of said negative acknowledgement signals, and the frames more recent than the frame designated by said one of said negative acknowledgement signals.

55. The method of claim 33, further comprising the steps of:
storing said frames in memory means in said transmitting device, pending selection as said reference frame; and
deleting from said memory means said frame that is negatively acknowledged, and the frames more recent than said frame that is negatively acknowledged.

56. The method of claim 55, wherein said acknowledgement signals comprise negative acknowledgement signals designating both a frame that could not be decoded successfully and a desired reference frame.

57. The coder of claim 4, wherein said acknowledgement signals comprise negative acknowledgement signals designating unsuccessfully decoded frames and desired reference frames, and when each one of said negative acknowledgement signals is received, said reference frame updating means selects, as said reference frame, the desired reference frame designated by said one of said negative acknowledgement signals.

58. The coder of claim 4, wherein said reference frame updating means comprises:
a list-keeping unit for keeping a list of candidate reference frames, and for adding the frames coded by said coding unit to said list of candidate reference frames; and
a deleting unit for, when one of said acknowledgement signals designates a frame as having been unsuccessfully decoded, deleting the frame thus designated, and all more recent frames in said series of frames, from said list of candidate reference frames;
and wherein said reference frame updating means selects, as said reference frame, one of the frames on said list of candidate reference frames.

59. The method of claim 31, wherein said acknowledgement signals comprise negative acknowledgement signals designating unsuccessfully decoded frames and desired reference frames, and said step of selecting said reference frame comprises:
selecting said desired reference frames as said reference frame.

60. The method of claim 31, wherein said step of selecting said reference frame comprises the further steps of:
keeping a list of candidate reference frames;
adding the frames coded by intra-frame coding and the frames coded by inter-frame coding to said list;
deleting from said list each frame that is negatively acknowledged;
simultaneously deleting from said list, frames more recent than the frame that is negatively acknowledged; and
selecting said reference frame from said list.

61. The coder of claim 4 wherein, when said frame that could not be decoded successfully is not stored in said memory means, said reference frame updating means selects a most recent frame stored in said memory means as said reference frame.

62. The method of claim 31, comprising the further step of:
storing said frames in memory means in said transmitting device, pending selection as said reference frame;
wherein said step of selecting said reference frame comprises selecting a most recent frame stored in said memory means, if said frame that could not be decoded successfully is not stored in said memory means.

63. The coder of claim 1, wherein said series of frames constitutes a moving picture.

64. The coder of claim 1, wherein each frame in said series of frames represents one picture.

65. The coder of claim 1, wherein each frame in said series of frames represents one part of one picture.

66. The coder of claim 2, wherein said series of frames constitutes a moving picture.

67. The coder of claim 2, wherein each frame in said series of frames represents one picture.

68. The coder of claim 2, wherein each frame in said series of frames represents one part of one picture.

69. The coder of claim 3, wherein said series of frames constitutes a moving picture.

70. The coder of claim 3, wherein each frame in said series of frames represents one picture.

71. The coder of claim 3, wherein each frame in said series of frames represents one part of one picture.

72. The coder of claim 4, wherein said series of frames constitutes a moving picture.

73. The coder of claim 4, wherein each frame in said series of frames represents one picture.

74. The coder of claim 4, wherein each frame in said series of frames represents one part of one picture.

75. The coder of claim 5, wherein said series of frames constitutes a moving picture.

76. The coder of claim 5, wherein each frame in said series of frames represents one picture.

77. The coder of claim 5, wherein each frame in said series of frames represents one part of one picture.

78. The coder of claim 6, wherein said series of frames constitutes a moving picture.

79. The coder of claim 6, wherein each frame in said series of frames represents one picture.

80. The coder of claim 6, wherein each frame in said series of frames represents one part of one picture.

81. The coder of claim 10, wherein said series of frames constitutes a moving picture.

82. The coder of claim 10, wherein each frame in said series of frames represents one picture.

83. The coder of claim 10, wherein each frame in said series of frames represents one part of one picture.

84. The decoder of claim 20, wherein said series of frames constitutes a moving picture.

85. The decoder of claim 21, wherein said series of frames constitutes a moving picture.

86. The decoder of claim 22, wherein said series of frames constitutes a moving picture.

87. The decoder of claim 23, wherein said series of frames constitutes a moving picture.

88. The decoder of claim 24, wherein said series of frames constitutes a moving picture.

89. The decoder of claim 25, wherein said series of frames constitutes a moving picture.

90. The decoder of claim 26, wherein said series of frames constitutes a moving picture.

91. The method of claim 27, wherein each frame in said series of frames represents one picture.

92. The method of claim 27, wherein each frame in said series of frames represents one part of one picture.

93. The method of claim 30, wherein each frame in said series of frames represents one picture.

94. The method of claim 30, wherein each frame in said series of frames represents one part of one picture.

95. The method of claim 31, wherein each frame in said series of frames represents one picture.

96. The method of claim 31, wherein each frame in said series of frames represents one part of one picture.

97. The method of claim 32, wherein each frame in said series of frames represents one picture.

98. The method of claim 32, wherein each frame in said series of frames represents one part of one picture.

99. The method of claim 33, wherein each frame in said series of frames represents one picture.

100. The method of claim 33, wherein each frame in said series of frames represents one part of one picture.

101. The method of claim 37, wherein each frame in said series of frames represents one picture.

102. The method of claim 37, wherein each frame in said series of frames represents one part of one picture.

* * * * *